United States Patent
Jiang et al.

(10) Patent No.: US 11,928,947 B2
(45) Date of Patent: Mar. 12, 2024

(54) FALL DETECTION-BASED HELP-SEEKING METHOD AND ELECTRONIC DEVICE

(71) Applicant: HUAWEI TECHNOLOGIES CO., LTD., Shenzhen (CN)

(72) Inventors: Yonghang Jiang, Shenzhen (CN); Xiaohan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 17/551,604

(22) Filed: Dec. 15, 2021

(65) Prior Publication Data
US 2022/0108595 A1 Apr. 7, 2022

Related U.S. Application Data

(63) Continuation of application No. PCT/CN2020/098359, filed on Jun. 28, 2020.

(30) Foreign Application Priority Data

Jun. 28, 2019 (CN) .......................... 201910577799.3

(51) Int. Cl.
G08B 21/04 (2006.01)
G08B 21/18 (2006.01)

(52) U.S. Cl.
CPC ....... *G08B 21/043* (2013.01); *G08B 21/0446* (2013.01); *G08B 21/0453* (2013.01); *G08B 21/0469* (2013.01); *G08B 21/182* (2013.01)

(58) Field of Classification Search
CPC .............. G08B 21/043; G08B 21/0446; G08B 21/0453; G08B 21/0469; G08B 21/182
(Continued)

(56) References Cited

U.S. PATENT DOCUMENTS 8,385,879 B2    2/2013  Thomas
9,990,836 B2 *  6/2018  Will ..................... G08B 25/016
(Continued)

FOREIGN PATENT DOCUMENTS

CN    103211599 A    7/2013
CN    103731557 A    4/2014
(Continued)

OTHER PUBLICATIONS

Shahiduzzaman, "Fall Detection by Accelerometer and Heart Rate Variability Measurement", Dec. 31, 2015, 8 pages.

*Primary Examiner* — Zhen Y Wu
(74) *Attorney, Agent, or Firm* — Maier & Maier, PLLC

(57) ABSTRACT

A fall detection-based help-seeking method and an electronic device, to improve accuracy of fall detection performed by an electronic device and reduce a probability of mistakenly triggering automatic help-seeking of the electronic device. A solution includes: the electronic device includes a motion sensor and the motion sensor includes an acceleration sensor or a gyro sensor. The electronic device collects a first motion parameter of a user by using the motion sensor. The electronic device obtains a fall confidence of the first motion parameter if the first motion parameter matches a first preset fall parameter, where the fall confidence of the first motion parameter is used to represent a probability that the first motion parameter is a motion parameter collected when the user falls. The electronic device sends help-seeking information if the fall confidence of the first motion parameter is greater than a preset confidence threshold.

17 Claims, 20 Drawing Sheets

(58) Field of Classification Search
USPC .................................................. 340/573.1
See application file for complete search history.

(56) References Cited

U.S. PATENT DOCUMENTS

| | | | |
|---|---|---|---|
| 11,170,295 B1* | 11/2021 | Carmichael | G06N 3/084 |
| 11,580,439 B1* | 2/2023 | Kahn | G06N 5/04 |
| 2003/0153836 A1 | 8/2003 | Gagnadre et al. | |
| 2008/0242261 A1* | 10/2008 | Shimanuki | G08B 25/016 |
| | | | 455/404.2 |
| 2009/0224925 A1* | 9/2009 | Gannot | G08B 21/0446 |
| | | | 340/573.1 |
| 2010/0261980 A1* | 10/2010 | Peng | G08B 21/0453 |
| | | | 600/301 |
| 2014/0066000 A1* | 3/2014 | Butler | G08B 21/043 |
| | | | 455/456.6 |
| 2014/0074442 A1* | 3/2014 | Doheny | G16H 50/20 |
| | | | 703/2 |
| 2014/0191863 A1* | 7/2014 | Ten Kate | A61B 5/7282 |
| | | | 340/539.12 |
| 2014/0313036 A1* | 10/2014 | Sweeney | G08B 21/043 |
| | | | 340/573.1 |
| 2015/0145662 A1 | 5/2015 | Barfield, Jr. et al. | |
| 2016/0038061 A1* | 2/2016 | Kechichian | A61B 5/1117 |
| | | | 600/301 |
| 2017/0332907 A1* | 11/2017 | Liang | G16Z 99/00 |
| 2017/0352240 A1* | 12/2017 | Carlton-Foss | A61B 5/1116 |
| 2018/0000385 A1* | 1/2018 | Heaton | G08B 25/016 |
| 2018/0064373 A1* | 3/2018 | Regev | G01S 7/539 |
| 2018/0357887 A1* | 12/2018 | Geyer | G08B 21/0469 |
| 2020/0196914 A1* | 6/2020 | Sacha | G08B 21/0446 |
| 2020/0367790 A1* | 11/2020 | Zhou | A61B 5/14542 |
| 2021/0049890 A1* | 2/2021 | Han | G06N 20/00 |

FOREIGN PATENT DOCUMENTS

| | | |
|---|---|---|
| CN | 104055518 A | 9/2014 |
| CN | 104065776 A | 9/2014 |
| CN | 104125337 A | 10/2014 |
| CN | 104510475 A | 4/2015 |
| CN | 105046882 A | 11/2015 |
| CN | 105551192 A | 5/2016 |
| CN | 106131792 A | 11/2016 |
| CN | 106227999 A | 12/2016 |
| CN | 107016347 A | 8/2017 |
| CN | 105342626 B | 6/2018 |
| CN | 108962377 A | 12/2018 |
| DE | 102016208617 A1 | 11/2017 |
| JP | 2008244732 A | 10/2008 |
| JP | 2022538432 A | 9/2022 |
| WO | 2015044635 A1 | 4/2015 |
| WO | 2019067424 A1 | 4/2019 |
| WO | 2019097248 A1 | 5/2019 |

* cited by examiner

FALL DETECTION-BASED HELP-SEEKING METHOD AND ELECTRONIC DEVICE

CROSS-REFERENCE TO RELATED APPLICATIONS

This is a continuation of International Patent Application No. PCT/CN2020/098359, filed on Jun. 28, 2020, which claims priority to Chinese Patent Application No. 201910577799.3, filed on Jun. 28, 2019. The disclosures of the aforementioned applications are hereby incorporated by reference in their entireties.

TECHNICAL FIELD

Embodiments relate to the field of wearable technologies, and in particular, to a fall detection-based help-seeking method and an electronic device.

BACKGROUND

With the development of society, more and more people live alone. For example, as aging intensifies, there are more empty-nesters. For people living alone, timely medical aid after an accidental fall can effectively reduce a risk of accidental injury or death. Therefore, it is of great practical significance to automatically detect an accidental fall and send help-seeking information.

Currently, some electronic devices (such as a smartwatch) have a function of automatically detecting a fall and sending help-seeking information. Users (such as elderly people) wearing such electronic devices can be aided in a timely manner after accidental falls. Specifically, these electronic devices each include a motion sensor (such as an acceleration sensor or a gyro sensor) configured to detect a motion parameter of a user. The electronic device may collect the motion parameter of the user by using the motion sensor, and automatically send help-seeking information (for example, automatically make a help-seeking call or automatically play a help-seeking speech) when the collected motion parameter matches a preset fall parameter.

However, a motion parameter of a common action (such as jumping) of the user is similar to a motion parameter of a fall. Therefore, when the user performs a common action whose motion parameter is similar to the motion parameter of the fall, the electronic device also considers that a fall event occurs to the user, and automatically sends help-seeking information. Accuracy of fall detection performed by the electronic device is relatively low, and automatic help-seeking is likely to be triggered by mistake.

SUMMARY

Embodiments provide a fall detection-based help-seeking method and an electronic device to improve accuracy of fall detection performed by an electronic device and reduce a probability of mistakenly triggering automatic help-seeking of the electronic device.

To achieve the foregoing objectives, the following solutions are used in the embodiments.

According to a first aspect, an embodiment provides a fall detection-based help-seeking method, and the method may be applied to an electronic device. The electronic device includes a motion sensor, and the motion sensor includes an acceleration sensor or a gyro sensor. The method may include: the electronic device collects a first motion parameter of a user by using the motion sensor. The electronic device obtains a fall confidence of the first motion parameter if the first motion parameter matches a first preset fall parameter. The electronic device sends help-seeking information if the fall confidence of the first motion parameter is greater than a preset confidence threshold. The fall confidence of the first motion parameter is used to represent a probability that the first motion parameter is a motion parameter collected when the user falls.

In this embodiment, that the electronic device determines whether the first motion parameter matches the first preset fall parameter is referred to as "first-layer detection" of fall detection.

In this embodiment, after determining that the first motion parameter matches the first preset fall parameter (that is, determining that the user may fall), the electronic device may further determine whether the fall confidence is greater than the preset confidence threshold. In other words, the electronic device may determine, through double detection, whether the user falls. In this way, accuracy of fall detection performed by the electronic device can be improved, and a probability of mistakenly triggering automatic help-seeking of the electronic device can be reduced.

With reference to the first aspect, in a possible implementation, a method in which the electronic device sends the help-seeking information may include: the electronic device plays a help-seeking speech or an alarm sound. After determining that the user falls, the electronic device plays the help-seeking speech or the alarm sound. In this way, people around can find the fallen user in a timely manner and aid the user in a timely manner.

With reference to the first aspect, in another possible implementation, a method in which the electronic device sends the help-seeking information may include: the electronic device calls a first preset contact. The first preset contact is any emergency contact or a public rescue service preset in the electronic device. For example, a phone number of the public rescue service may be an emergency phone number (for example, 120) or an alarm phone number (for example, 110). The emergency contact may be preset by the user in a wearable device 10.

With reference to the first aspect, in another possible implementation, if the user is not seriously injured after falling, the user has an autonomous behavior capability. In this case, the user may expect to autonomously select an object for help-seeking. For example, when the fall is not serious, the user may prefer to seek help from a family member or a friend rather than dialing the emergency phone number 120. Based on this case, before sending the help-seeking information, the electronic device may display a first interface including a plurality of contact options, where each contact option corresponds to one preset contact in the electronic device. The electronic device may receive a selection operation performed by the user on a contact option of the first preset contact in the first interface. The electronic device may call the first preset contact in response to the selection operation performed by the user on the contact option of the first preset contact.

With reference to the first aspect, in another possible implementation, after the electronic device calls the preset contact corresponding to the contact option selected by the user (that is, requests voice communication with the contact selected by the user), if the voice communication is not answered within a first preset time period (for example, 1 minute, 50 seconds, 30 seconds, or 15 seconds), the electronic device may automatically call another preset contact, to send the help-seeking information. In some other embodiments, if the voice communication is not answered within the first preset time period, the electronic device may further automatically send a first message to one or more preset contacts.

With reference to the first aspect, in another possible implementation, if the electronic device does not receive a selection operation of the user in the first interface within a second preset time period, the electronic device may automatically call any preset contact, or send a first message to one or more preset contacts.

With reference to the first aspect, in another possible implementation, a method in which the electronic device sends the help-seeking information may include: the electronic device sends a first message to one or more preset contacts through one or more communication applications. The first message includes the help-seeking information. The preset contact includes the emergency contact or the public rescue service preset in the electronic device. For example, the electronic device may send the first message to the one or more preset contacts through the one or more communication applications. The one or more communication applications may be communication applications installed in the electronic device. The one or more communication applications are applications that are installed in the electronic device and that can communicate with another device (for example, a mobile phone of a preset contact). For example, the communication application may be a messaging application, Email, iMessage, WeChat, QQ, or Alipay, or the like.

With reference to the first aspect, in another possible implementation, to enable a rescuer (for example, a family member or a friend of the user, or a public rescue service worker) to accurately find the user in a timely manner, the electronic device may further include a positioning module. The method may further include: the electronic device obtains geographical location information of the electronic device by using the positioning module. The first message further includes the geographical location information.

With reference to the first aspect, in another possible implementation, after sending the first message to the one or more preset contacts, the electronic device may send first prompt information. The first prompt information is used to prompt the user that the electronic device has sent a help-seeking message.

With reference to the first aspect, in another possible implementation, if the user is seriously injured after falling, the user needs to be aided in a timely manner, to effectively reduce a risk of accidental injury or death. However, after the electronic device makes the call or sends the first message for help-seeking, even if the rescuer can receive the help-seeking of the user in a timely manner, the rescuer may not be able to aid the user in a timely manner. In this case, because an optimal aid time is missed, life of the user may be in danger, or a body of the user may be irreversibly harmed. To increase a probability that the user is aided in a timely manner after the user falls, the electronic device may further play the help-seeking speech or the alarm sound when making the call and/or sending the first message. In this way, after the user falls, people around can find the fallen user in a timely manner and aid the user in a timely manner.

With reference to the first aspect, in another possible implementation, the electronic device may further include a positioning module. The method may further include: the electronic device collects speech data of the user; and in response to the speech data, performs a speech control event corresponding to the speech data, and sends the help-seeking information. For example, the speech data may be "call my son", "send a WeChat message to tell my daughter that I fell", or "dial 120".

With reference to the first aspect, in another possible implementation, the electronic device stores model code of a first fall detection model. The first fall detection model is used to determine a fall confidence of a motion parameter. The first fall detection model is an artificial intelligence (AI) model obtained by performing sample training by using a plurality of second motion parameters. Alternatively, the first fall detection model is an AI model obtained by performing sample training by using a plurality of second motion parameters and a plurality of third motion parameters. The plurality of second motion parameters are motion parameters collected when a plurality of users fall. The plurality of third motion parameters are motion parameters collected when the plurality of users perform a preset interference action. Correspondingly, that the electronic device obtains the fall confidence of the first motion parameter may include: the electronic device runs the model code of the first fall detection model, to determine the fall confidence of the first motion parameter. In this embodiment, fall detection performed by comparing the fall confidence obtained by running the model code of the first fall detection model with the preset confidence threshold is referred to as "third-layer detection". It may be understood that, compared with "second-layer detection", the "third-layer detection" is more accurate, and therefore, accuracy of fall detection can be improved.

With reference to the first aspect, in another possible implementation, that the electronic device obtains the fall confidence of the first motion parameter includes: the electronic device obtains a matching degree between the first motion parameter and a first preset interference parameter, and determines the fall confidence based on the matching degree. A lower matching degree indicates a higher fall confidence, and a higher matching degree indicates a lower fall confidence. In this embodiment, "the electronic device compares the first motion parameter with the first preset interference parameter" is referred to as "second-layer detection". Through the "second-layer detection", the electronic device can exclude mistaken triggering caused by the preset interference action on automatic help-seeking of the electronic device.

With reference to the first aspect, in another possible implementation, to further improve accuracy of fall detection performed by the wearable device 10, in some other embodiments, the electronic device may determine, through triple detection, that is, the "first-layer detection", the "second-layer detection", and the "third-layer detection", whether the user falls. For example, if the first motion parameter matches the first preset fall parameter, before the electronic device obtains the fall confidence of the first motion parameter, the method may further include: the electronic device determines that the first motion parameter is not a first preset interference parameter.

With reference to the first aspect, in another possible implementation, the electronic device may be a first wearable device. A type of the first wearable device is at least one of a wearable device supported by a wrist, a wearable device supported by a head, and a wearable device supported by a foot.

With reference to the first aspect, in another possible implementation, the method may further include: the electronic device receives the model code that is of the first fall detection model and that is sent by a server. The electronic device stores the model code of the first fall detection model.

The server stores model code of a plurality of fall detection models. Each fall detection model corresponds to one type of wearable devices. Different types of electronic devices (such as wearable devices) correspond to different fall detection models. The first fall detection model is a fall detection model corresponding to the type of the first wearable device.

With reference to the first aspect, in another possible implementation, the method may further include: the electronic device receives the first preset fall parameter sent by the server. The electronic device stores the first preset fall parameter. The server stores a plurality of preset fall parameters, each preset fall parameter corresponds to one type of wearable devices, different types of wearable devices correspond to different preset fall parameters, and the first preset fall parameter is a preset fall parameter corresponding to the type of the first wearable device.

With reference to the first aspect, in another possible implementation, the method may further include: the electronic device receives the first preset interference parameter sent by the server. The electronic device stores the first preset interference parameter. The server stores a plurality of preset interference parameters, each preset interference parameter corresponds to one type of wearable devices, different types of wearable devices correspond to different preset interference parameters, and the first preset interference parameter is a preset interference parameter corresponding to the type of the first wearable device.

With reference to the first aspect, in another possible implementation, the method may further include: the electronic device sends a second message to the server if the fall confidence of the first motion parameter is greater than the preset confidence threshold. The second message includes the first motion parameter, first indication information, and a first identifier. The first indication information is used to indicate that the first motion parameter is a motion parameter collected when the user falls. The first identifier is used to indicate a type of the electronic device (for example, the first wearable device). The second message is used to indicate the server to update the first preset fall parameter and the first fall detection model by using the first motion parameter.

It may be understood that the server may receive motion parameters sent by a large quantity of electronic devices after the electronic devices determine that users fall and update the first preset fall parameter and the first fall detection model in the server by using the motion parameters. That the server updates the first fall detection model by using the first motion parameter as a fall parameter means that the server performs model training by using the first motion parameter as a training sample, so that the first fall detection model can learn of a capability of determining that the first motion parameter is motion data collected when the user falls. Then, the server may further send an updated first preset fall parameter and model code of an updated first fall detection model to a plurality of electronic devices managed by the server. For example, the server may periodically send the updated first preset fall parameter and the model code of the updated first fall detection model to the plurality of electronic devices. The electronic device performs fall detection by using the updated first preset fall parameter and the model code of the updated first fall detection model, so that accuracy of fall detection can be improved.

With reference to the first aspect, in another possible implementation, the method may further include: the electronic device sends a third message to the server if the fall confidence of the first motion parameter is less than or equal to the preset confidence threshold. The third message includes the first motion parameter, second indication information, and a first identifier. The second indication information is used to indicate that the first motion parameter is a motion parameter collected when the user performs the preset interference action. The first identifier is used to indicate a type of the electronic device (for example, the first wearable device). The third message is used to indicate the server to update the first preset interference parameter and the first fall detection model by using the first motion parameter.

It may be understood that the server may receive motion parameters sent by a large quantity of electronic devices after the electronic devices determine that users do not fall and update the first preset interference parameter in the server by using the motion parameters. Then, the server may further send an updated first preset interference parameter to a plurality of electronic devices managed by the server. For example, the server may periodically send the updated first preset interference parameter to the plurality of electronic devices. The electronic device performs fall detection by using the updated first preset interference parameter, so that accuracy of fall detection can be improved.

With reference to the first aspect, in another possible implementation, the electronic device further includes a heart rate sensor and a microphone. The method further includes: the electronic device collects heart rate information of the user by using the heart rate sensor and collects speech data of the user by using the microphone. If the fall confidence of the first motion parameter is less than or equal to the confidence threshold, the electronic device determines that the microphone collects a preset moaning sound, bumping sound, or crying sound, or the heart rate information indicates that a heart rate of the user is less than a first quantity of heartbeats or greater than a second quantity of heartbeats. The electronic device sends the help-seeking information. The first quantity of heartbeats is a minimum quantity of heartbeats per minute of a normal person, and the second quantity of heartbeats is a maximum quantity of heartbeats per minute of a normal person.

In this embodiment, the electronic device may further determine, based on whether the user makes the preset moaning sound or crying sound and whether the heart rate of the user is normal, whether the user falls. This can improve accuracy of fall detection performed by the electronic device.

With reference to the first aspect, in another possible implementation, the acceleration sensor is a 3-axis acceleration sensor, a 6-axis acceleration sensor, or a 9-axis acceleration sensor. The gyro sensor is a 3-axis gyro sensor, a 6-axis gyro sensor, or a 9-axis gyro sensor.

According to a second aspect, the embodiments provide an electronic device. The electronic device includes a motion sensor, and the motion sensor includes an acceleration sensor or a gyro sensor. The electronic device further includes a memory and one or more processors. The motion sensor, the memory, and the processor are coupled. The memory is configured to store computer program code, the computer program code includes computer instructions, and when the processor executes the computer instructions, the electronic device performs the method according to any one of the first aspect and the possible implementations of the first aspect.

According to a third aspect, the embodiments provide a chip system. The chip system is used in an electronic device including a touchscreen, and the chip system includes one or more interface circuits and one or more processors. The interface circuit and the processor are interconnected through a line, the interface circuit is configured to receive a signal from a memory of the electronic device, and send the signal to the processor, and the signal includes computer instructions stored in the memory. When the processor executes the computer instructions, the electronic device performs the method according to any one of the first aspect and the possible implementations of the first aspect.

According to a fourth aspect, the embodiments provide a computer storage medium. The computer storage medium includes computer instructions, and when the computer instructions are run on an electronic device, the electronic device is enabled to perform the method according to any one of the first aspect and the possible implementations of the first aspect.

According to a fifth aspect, the embodiments provide a computer program product. When the computer program product runs on a computer, the computer is enabled to perform the method according to any one of the first aspect and the possible implementations of the first aspect.

It may be understood that for beneficial effects that can be achieved by the electronic device according to the second aspect, the chip system according to the third aspect, the computer storage medium according to the fourth aspect, and the computer program product according to the fifth aspect, refer to the beneficial effects in any one of the first aspect and the possible implementations of the first aspect. Details are not described herein again.

DETAILED DESCRIPTION OF THE EMBODIMENTS

The following terms "first" and "second" are merely intended for a purpose of description and shall not be understood as an indication or implication of relative importance or implicit indication of a quantity of indicated features. Therefore, a feature limited by "first" or "second" may explicitly or implicitly include one or more such features. In the descriptions of the embodiments, unless otherwise stated, "a plurality of" means two or more than two.

Figure 1A:
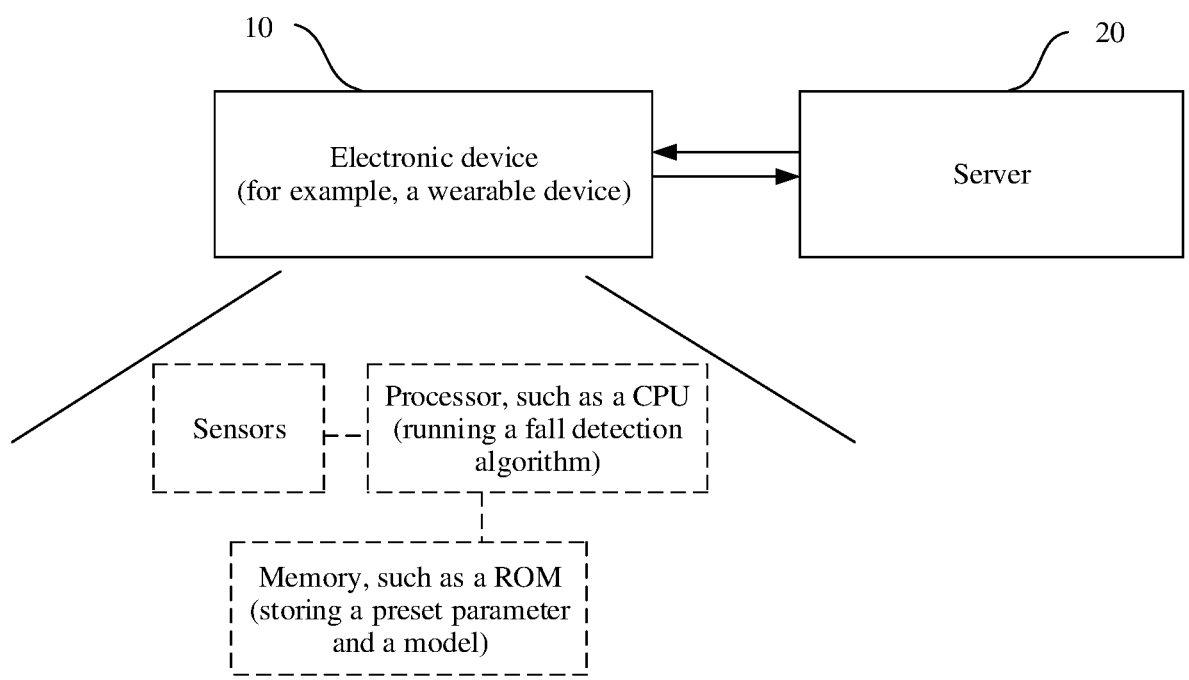
FIG. 1A is a schematic diagram depicting an architecture of a fall detection system according to an embodiment.

FIG. 1A is a schematic diagram depicting an architecture of a fall detection system according to an embodiment. As shown in FIG. 1A, the system may include an electronic device 10 and a server 20. A fall detection-based help-seeking method provided in an embodiment may be applied to the electronic device 10. The electronic device 10 includes a plurality of sensors, a processor, and a memory. The plurality of sensors may include a motion sensor. The motion sensor may include at least an acceleration sensor (accelerometer or G-sensor) and a gyro sensor (gyroscope or gyro-sensor). For detailed descriptions of the processor and the memory, refer to descriptions in the following embodiments. Details are not described in this embodiment.

The acceleration sensor may be a 3-axis acceleration sensor, a 6-axis acceleration sensor, or a 9-axis acceleration sensor. The gyro sensor may be a 3-axis gyro sensor, a 6-axis gyro sensor, or a 9-axis gyro sensor.

In this embodiment, the electronic device 10 may collect a motion parameter (that is, a first motion parameter) of a user by using the motion sensor. Even if the first motion parameter matches a preset fall parameter, the electronic device 10 does not immediately send help-seeking information. Instead, the help-seeking information is sent only when a fall confidence of the first motion parameter is greater than a preset threshold.

When the first motion parameter matches the preset fall parameter, it indicates that the user may fall. The fall confidence is used to represent a probability that the first motion parameter is a motion parameter collected when the user falls, that is, a probability that the user falls. A higher fall confidence indicates a higher probability that the user falls, and a lower fall confidence indicates a lower probability that the user falls.

In this embodiment, after determining that the first motion parameter matches the preset fall parameter (that is, determining that the user may fall), the electronic device 10 may further determine whether the fall confidence is greater than the preset confidence threshold. In other words, the electronic device 10 may determine, through double detection, whether the user falls. In this way, accuracy of fall detection performed by the electronic device 10 can be improved, and a probability of mistakenly triggering automatic help-seeking of the electronic device 10 can be reduced.

The preset fall parameter and the preset confidence threshold may be configured in the electronic device 10 before delivery of the electronic device 10. Alternatively, the preset fall parameter and the preset confidence threshold may be sent by the server 20 to the electronic device 10. For example, the server 20 may periodically send an updated preset fall parameter and/or an updated preset confidence threshold to the electronic device 10.

For example, the electronic device 10 in this embodiment may be a portable electronic device 10 that can be carried by the user, for example, a mobile phone or a wearable device.

For example, the wearable device in this embodiment may be a watch-type wearable device supported by a wrist, for example, a smartwatch or a smart band; a shoes-type wearable device supported by a foot, for example, a smart anklet worn on an ankle or a wearable product worn on a shoe or sock; a glass-type wearable device supported by a head, for example, smart glasses, a smart helmet, or a smart headband; or a wearable device used as an accessory, for example, various wearable products such as smart clothes, a smart bag, a smart crutch, and smart jewelry.

Figure 1B:
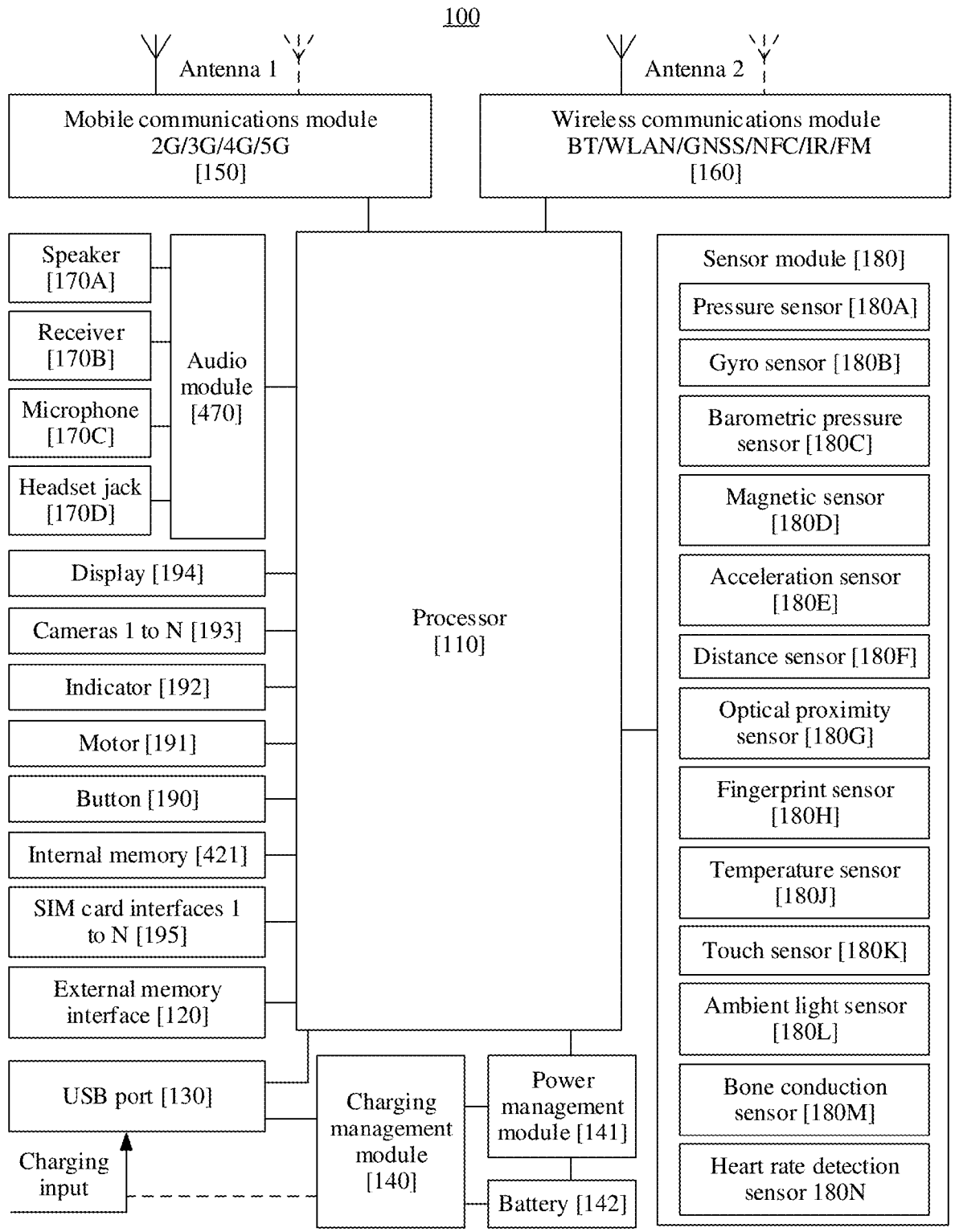
FIG. 1B is a schematic diagram depicting a hardware structure of a mobile phone according to an embodiment.

As shown in FIG. 1B, a mobile phone (that is, a mobile phone 100) is used as an example for the foregoing electronic device. The mobile phone 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, a heart rate sensor 180N, and the like. Motion sensors in the embodiments may include the acceleration sensor 180E and the gyro sensor 180B.

It may be understood that a structure shown in this embodiment does not constitute a limitation on the mobile phone 100. In some other embodiments, the mobile phone 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices or may be integrated into one or more processors.

The controller may be a nerve center and a command center of the mobile phone 100. The controller may generate an operation control signal based on instruction operation code and a time sequence signal, to complete control of instruction fetching and instruction execution.

A memory may be further disposed in the processor 110 and is configured to store instructions and data. In some embodiments, the memory in the processor 110 is a cache.

The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110. Therefore, system efficiency is improved. The memory may further store a Bluetooth address of the mobile phone 100. In addition, the memory may further store the foregoing preset fall parameter and preset confidence threshold, and information about one or more emergency contacts that are set by a user in the mobile phone 100, for example, a phone number and an account of an instant communication application (which is also referred to as an instant messaging application). The memory may further store a phone number of a public rescue service, such as an emergency phone number (for example, 120) and an alarm phone number (for example, 110).

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter ( ) interface, a mobile industry processor interface (MIPI), a general-purpose input/output (GPIO) interface, a subscriber identification module (SIM) interface, a universal serial bus (USB) port, and/or the like.

The charging management module 140 is configured to receive charging input from a charger. The charger may be a wireless charger or a wired charger. The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented through the antenna 1, the antenna 2, the mobile communications module 150, the wireless communications module 160, a modem processor, a baseband processor, and the like. The antenna 1 and the antenna 2 are configured to transmit and receive electromagnetic wave signals. Each antenna in the mobile phone 100 may be configured to cover one or more communication bands. Different antennas may be further multiplexed, to improve antenna utilization.

The mobile communications module 150 may provide a wireless communication solution that includes 2G/3G/4G/5G or the like and that is applied to the mobile phone 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor and convert the signal into an electromagnetic wave for radiation through the antenna 1.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to an application processor. The application processor outputs a sound signal through an audio device (which is not limited to the speaker 170A, the receiver 170B, or the like), or displays an image or a video through the display 194.

The wireless communications module 160 may provide a wireless communication solution that includes a wireless local area network (wireless local area network, WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the mobile phone 100. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the mobile phone 100 are coupled, and the antenna 2 and the wireless communications module 160 in the mobile phone 100 are coupled, so that the mobile phone 100 can communicate with a network and another device through a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The mobile phone 100 implements a display function by using the GPU, the display 194, the application processor, and the like. The GPU is a microprocessor for image processing and is connected to the display 194 and the application processor. The GPU is configured to: perform mathematical and geometric calculation and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the mobile phone 100 may include one or N displays 194, where N is a positive integer greater than 1.

The mobile phone 100 may implement a photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB or YUV. In some embodiments, the mobile phone 100 may include one or N cameras 193, where N is a positive integer greater than 1.

The digital signal processor is configured to process a digital signal. In addition to the digital image signal, the digital signal processor may further process another digital signal. For example, when the mobile phone 100 selects a frequency, the digital signal processor is configured to perform Fourier transform and the like on frequency energy.

The video codec is configured to compress or decompress a digital video. The mobile phone 100 may support one or more video codecs. In this way, the mobile phone 100 can play or record videos of a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the mobile phone 100, for example, image recognition, facial recognition, speech recognition, text understanding, and motion parameter recognition, can be implemented through the NPU. For example, the NPU may run model code of a fall detection model in the embodiments, and perform the foregoing motion parameter recognition service, to determine a fall confidence of a motion parameter.

The external memory interface 120 may be configured to be connected to an external memory card such as a micro SD card, to extend a storage capability of the mobile phone 100. The external memory card communicates with the processor 110 through the external memory interface 120, to implement a data storage function. For example, files such as music and videos are stored in the external memory card.

The internal memory 121 may be configured to store computer-executable program code, and the executable program code includes instructions. The processor 110 runs the instructions stored in the internal memory 121, to implement various function applications and data processing of the mobile phone 100. The internal memory 121 may include a program storage area and a data storage area. The program storage area may store an operating system, an application required by at least one function (for example, a voice playing function or an image playing function), and the like. The data storage area may store data (such as audio data and a phone book) created during use of the mobile phone 100, and the like. In addition, the internal memory 121 may include a high-speed random access memory, and may further include a nonvolatile memory, for example, at least one magnetic disk storage device, a flash memory device, or a universal flash storage (UFS).

The mobile phone 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output and is also configured to convert analog audio input into a digital audio signal. The audio module 170 may be further configured to code and decode audio signals. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The mobile phone 100 may listen to music or answer a hands-free call through the speaker 170A. In the embodiments, the speaker 170A is further configured to play a help-seeking speech.

The receiver 170B, also referred to as an "earpiece", is configured to convert an audio electrical signal into a sound signal. When a call is answered or speech information is received by using the mobile phone 100, the receiver 170B may be put close to a human ear to listen to a speech.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like. In the embodiments, the microphone 170C may be configured to collect a sound signal, such as a moaning sound, a bumping sound, and a crying sound.

The headset jack 170D is configured to connect to a wired headset. The headset jack 170D may be the USB port 130 or may be a 3.5 mm open mobile terminal platform (OMTP) standard interface or a cellular telecommunications industry association of the USA (CTIA) standard interface.

The pressure sensor 180A is configured to sense a pressure signal and can convert the pressure signal into an electrical signal. The barometric pressure sensor 180C is configured to measure barometric pressure. The distance sensor 180F is configured to measure a distance. The mobile phone 100 may measure a distance through infrared light or a laser. For example, the optical proximity sensor 180G may include a light-emitting diode (LED) and an optical detector, for example, a photodiode. The light-emitting diode may be an infrared light-emitting diode. The mobile phone 100 emits infrared light through the light-emitting diode. The mobile phone 100 detects infrared reflected light from a nearby object by using the photodiode. When sufficient reflected light is detected, it can be determined that there is an object near the mobile phone 100. The ambient light sensor 180L is configured to sense ambient light brightness. The fingerprint sensor 180H is configured to collect a fingerprint. The temperature sensor 180J is configured to detect a temperature. The bone conduction sensor 180M may obtain a vibration signal. The magnetic sensor 180D includes a Hall sensor. The mobile phone 100 may detect opening and closing of a flip leather case by using the magnetic sensor 180D.

The gyro sensor 180B may be configured to determine a motion posture of the mobile phone 100. In some embodiments, an angular velocity of the mobile phone 100 around three axes (namely, x, y, and z axes) may be determined by using the gyro sensor 180B.

The acceleration sensor 180E may detect values of acceleration of the mobile phone 100 in various directions (usually on three axes). When the mobile phone 100 is still, a value and a direction of gravity may be detected. The acceleration sensor 180E may be further configured to identify a posture of the mobile phone 100 and is applied to an application such as a pedometer.

It may be understood that the gyro sensor 180B is configured to measure the angular velocity of the mobile phone 100, and the acceleration sensor 180E is configured to measure the acceleration of the mobile phone 100. Motion sensors in the embodiments may include the gyro sensor 180B and the acceleration sensor 180E. In other words, in the embodiments, the gyro sensor 180B and the acceleration sensor 180E are used together to collect a motion parameter of the electronic device. For example, in a fall process of a user, the motion parameter collected by the motion sensor may be used to indicate that the mobile phone 100 is weightless, then receives great impact force, and finally keeps still within a specific time period (or a motion amplitude is less than a preset threshold). Usually, the mobile phone 100 is carried by the user. Therefore, the motion parameter of the mobile phone 100 may also be considered as a motion parameter of the user carrying the mobile phone 100.

For example, the acceleration sensor 180E may be a 3-axis acceleration sensor, a 6-axis acceleration sensor, or a 9-axis acceleration sensor. The gyro sensor 180B may be a 3-axis gyro sensor, a 6-axis gyro sensor, or a 9-axis gyro sensor.

The heart rate sensor 180N is configured to measure a heart rate of the user. For example, the heart rate sensor 180N may be an optical heart rate sensor. The optical heart rate sensor may measure the heart rate by using a photoplethysmography method. Briefly, light is used to measure a pulse. Blood is red and can reflect red light and absorb green light. The mobile phone or a wearable device detects, by using the optical heart rate sensor, an amount of blood flowing through a wrist at a specific time point. At a moment of a heartbeat, the amount of blood flowing through the wrist increases, and more green light is absorbed. At a heartbeat interval, less green light is absorbed. LED light is emitted to a skin, and light reflected back through skin tissue is received by a photosensitive device in the optical heart rate sensor. The LED light flashes hundreds of times per second. The optical heart rate sensor may calculate, based on green light received by the photosensitive device, a quantity of heartbeats per minute of the user, that is, the heart rate.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide visual output related to the touch operation. In some other embodiments, the touch sensor 180K may alternatively be disposed on a surface of the mobile phone 100 and is at a location different from that of the display 194. In some embodiments, after the mobile phone 100 determines that the user falls, the touch sensor 180K may collect an operation entered by the user on the touchscreen. In response to the operation, the mobile phone 100 may send the help-seeking information in a manner corresponding to the operation.

The button 190 includes a power button, a volume button, and the like. The button 190 may be a mechanical button or may be a touch button. The motor 191 may generate a vibration prompt. The motor 191 may be configured to provide an incoming call vibration prompt or a touch vibration feedback. The indicator 192 may be an indicator light, may be configured to indicate a charging status and a power change, and may be configured to indicate a message, a missed call, a notification, and the like. The SIM card interface 195 is configured to connect to a SIM card. The SIM card may be inserted into the SIM card interface 195 or detached from the SIM card interface 195, to implement contact with or detachment from the mobile phone 100. The mobile phone 100 may support one or N SIM card interfaces, where N is a positive integer greater than 1.

Figure 2:
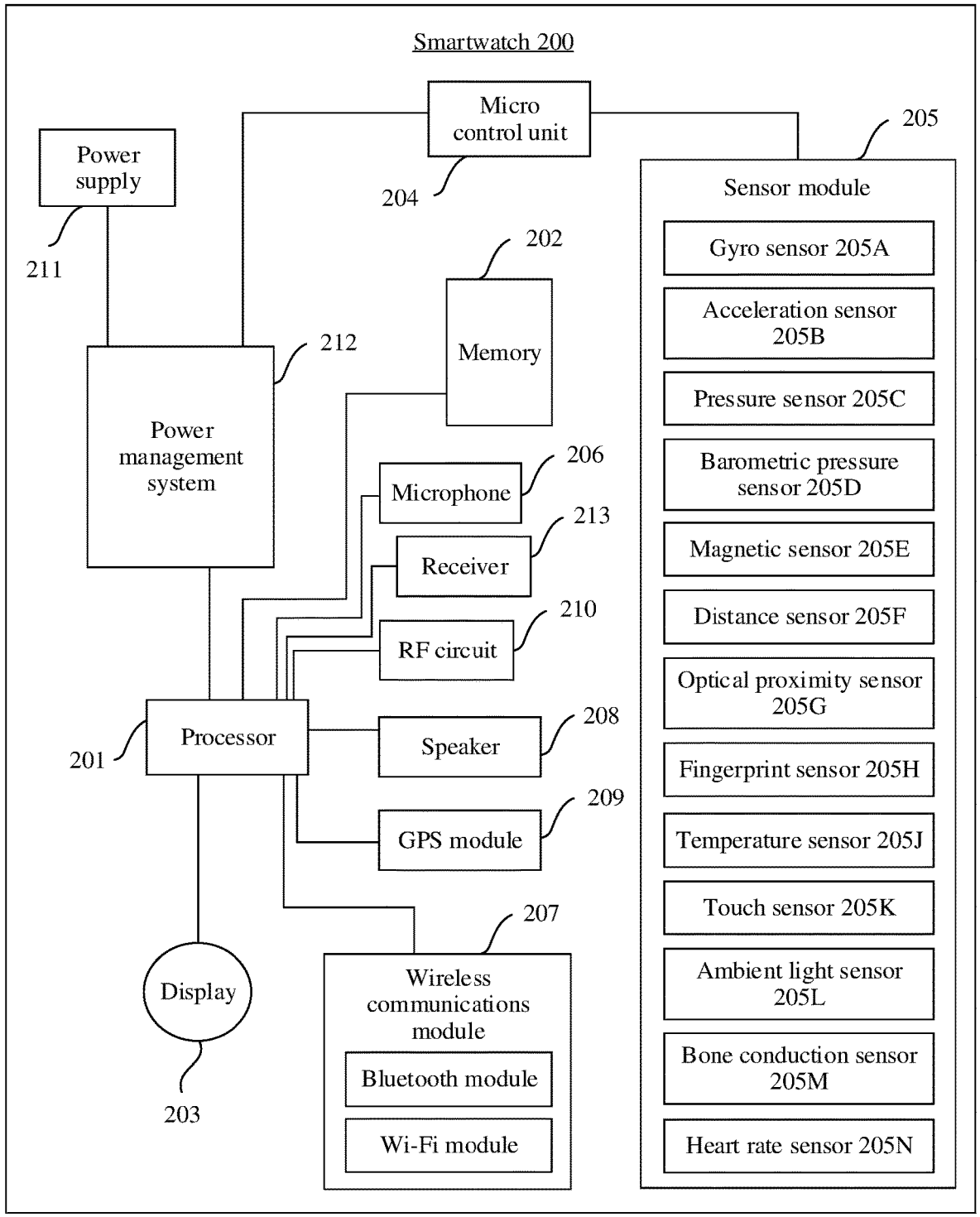
FIG. 2 is a schematic diagram depicting a hardware structure of a smartwatch according to an embodiment.

In some other embodiments, the electronic device may be a wearable device. As shown in FIG. 2, a smartwatch 200 is used as an example for the wearable device. As shown in FIG. 2, the smartwatch 200 includes a watch body and a wrist strap that are connected to each other. The watch body may include a front housing (not shown in FIG. 2), a processor 201, a memory 202, a display 203 (such as a touchscreen), a rear housing (not shown in FIG. 2), a micro control unit (MCU) 204, a sensor module 205, a microphone (MIC) 206, a wireless communications module 207, a GPS module 209, a speaker 208, an RF circuit 210, a power supply 211, a power management module 212, a receiver 213, and the like. Although not shown, the smartwatch 200 may further include an antenna, a button, an indicator, and the like. A person ordinary skill in the art may understand that a structure of the smartwatch 200 shown in FIG. 2 does not impose a limitation on the smartwatch, and the smartwatch may include more or fewer components than those shown in the figure, combine some components, or have different component arrangements.

The sensor module 205 may include at least a gyro sensor 205A and an acceleration sensor 205B, that is, motion sensors in the embodiments. Additionally, the sensor module 205 may further include a pressure sensor 205C, a barometric pressure sensor 205D, a magnetic sensor 205E, a distance sensor 205F, an optical proximity sensor 205G, a fingerprint sensor 205H, a temperature sensor 205J, a touch sensor 205K, an ambient light sensor 205L, a bone conduction sensor 205M, a heart rate sensor 205N, and the like. The sensor module 205 is connected to the MCU 204 and is controlled by the MCU 204.

It should be noted that for functions of the sensors in the sensor module 205, refer to the descriptions of the sensors in the sensor module 180 in the foregoing embodiment. Details are not described in this embodiment.

The memory 202 may be configured to store application program code, for example, application program code used to perform fall detection by performing the method in the embodiments. The processor 201 may execute the application program code to implement a function of the smartwatch 200 in this embodiment.

The memory 202 may further store a Bluetooth address of the smartwatch 200. In addition, the memory 202 may further store information about one or more emergency contacts that are set by a user in the smartwatch 200, for example, a phone number and an account of an instant communication application (which is also referred to as an instant messaging application). The memory 202 may further store a phone number of a public rescue service, such as an emergency phone number (for example, 120) and an alarm phone number (for example, 110). The Bluetooth address may be a media access control (MAC) address.

The wireless communications module 207 is configured to support short-range data exchange between the smartwatch 200 and various electronic devices, for example, the mobile phone 100. In some embodiments, the wireless communications module 207 may be a Bluetooth module. In some other embodiments, the wireless communications module 207 may be a Wi-Fi module.

The smartwatch 200 may include at least one receiver 213 and at least one microphone 206. The receiver 213 may also be referred to as an "earpiece", and may be configured to convert an audio electrical signal into a sound signal and play the sound signal. The microphone 206 may also be referred to as a "mike" or a "mic", and is configured to convert a sound signal into an audio electrical signal. The audio electrical signal is received by an audio circuit and converted into audio data. The audio circuit may also convert the audio data into an electrical signal and transmit the electrical signal to the speaker 208. The speaker 208 converts the electrical signal into a sound signal for output. In the embodiments, the speaker 208 may be further configured to play a help-seeking speech.

The display 203 may be a touchscreen. The touchscreen includes a display panel and a touch panel. The display 203 may be configured to display information entered by the user or information provided for the user, and various menus of the watch. Optionally, the display 203 may be configured in a form of an LCD, an OLED, or the like. After detecting a touch operation on or near the touch panel, the touch panel transfers the touch operation to the processor 201 to determine a type of a touch event. Subsequently, the processor 201 provides corresponding visual output on the display 203 based on the type of the touch event.

The smartwatch 200 further includes the power supply 211 (for example, a battery) that supplies power to each component. Optionally, the power supply 211 may be logically connected to the processor 201 through the power management system 212, to implement functions such as charging management, discharging management, and power consumption management through the power management system 212.

Further, the smartwatch 200 shown in FIG. 2 may further include the RF circuit 210. The RF circuit 210 may be configured to receive and send signals in an information receiving and sending process or a call process. The RF circuit 210 may receive downlink information from a base station, transmit the downlink information to the processor 201 for processing, and send uplink data to the base station. Usually, the RF circuit 210 includes but is not limited to an antenna, at least one amplifier, a transceiver, a coupler, a low noise amplifier, a duplexer, or the like. In addition, the RF circuit 210 may further communicate with a network and another mobile device through wireless communication. The wireless communication may use any communications standard or protocol, including but not limited to a global system for mobile communications, a general packet radio service, code division multiple access, wideband code division multiple access, long term evolution, an email, a short message service, or the like.

The smartwatch 200 may further include a positioning module, such as the GPS module 209 shown in FIG. 2. Further, the positioning module may alternatively be a global navigation satellite system GLONASS module, a BDS module, or the like. The positioning module is configured to obtain geographical location information of the smartwatch 200. In this embodiment, after detecting that the user falls, the smartwatch 200 may send help-seeking information including the geographical location information of the smartwatch 200 to an emergency contact or an emergency center. In this way, the emergency contact or the emergency center can quickly and accurately locate the fallen person who needs help and provide help in a timely manner.

It should be understood that the smartwatch 200 shown in FIG. 2 is merely an example for a wearable device, and the smartwatch 200 may have more or fewer components than those shown in the figure, or may combine two or more components, or may have different component configurations. The components shown in FIG. 2 may be implemented in hardware including one or more signal processing and/or application-specific integrated circuits, software, or a combination of hardware and software.

In the following embodiments, an example in which the electronic device is the wearable device 10 (that is, a first wearable device) shown in FIG. 1A is used. The wearable device 10 is worn by a user "a". In the embodiments, an example in which the wearable device 10 performs fall detection on the user "a" is used to describe the method in the embodiments.

Figure 3:
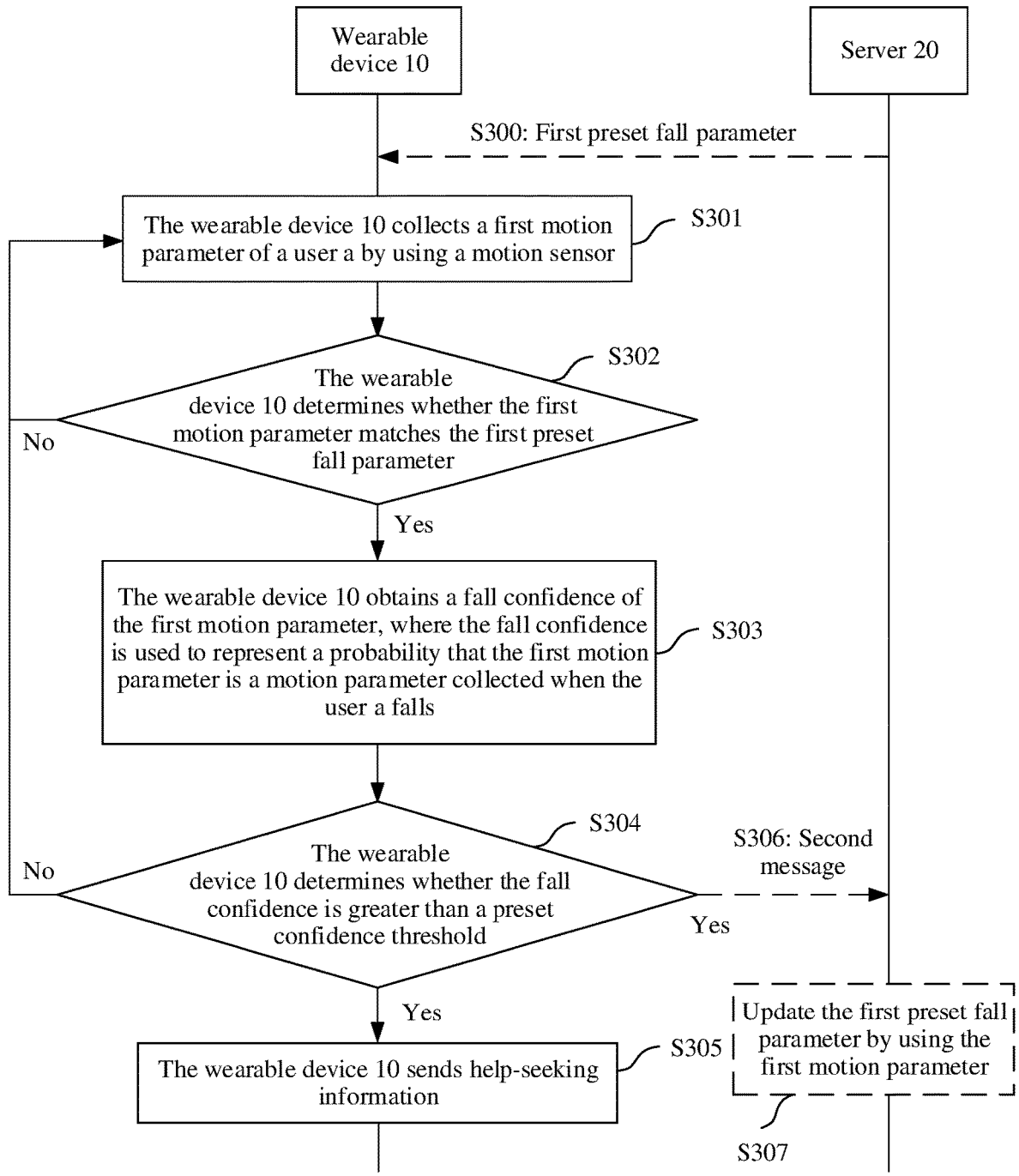
FIG. 3 is a flowchart depicting a fall detection-based help-seeking method according to an embodiment.

An embodiment provides a fall detection-based help-seeking method. As shown in FIG. 3, the fall detection-based help-seeking method may include S301 to S305.

S301: The wearable device 10 collects a first motion parameter of the user "a" by using a motion sensor.

The motion sensor may include an acceleration sensor or a gyro sensor. The acceleration sensor is configured to collect acceleration of motion of the wearable device 10, and the gyro sensor is configured to collect angular velocity of the motion of the wearable device 10. In other words, the first motion parameter may include the acceleration and the angular velocity of the motion of the wearable device 10.

It may be understood that because the wearable device 10 is worn by the user "a", the motion of the wearable device 10 is generated due to motion of the user "a". In this case, the first motion parameter collected by the wearable device 10 may be considered as a motion parameter of the user "a". The first motion parameter may include acceleration and angular velocity of the motion of the user "a".

The motion parameter collected by the motion sensor varies with an action performed by the user "a". For example, a motion parameter collected by the motion sensor when the user "a" sleeps is different from a motion parameter collected by the motion sensor when the user "a" falls. Therefore, the wearable device 10 may determine, based on the first motion parameter collected by the motion sensor, whether the user "a" falls.

S302: The wearable device 10 determines whether the first motion parameter matches a first preset fall parameter.

Usually, when the user falls, the user sequentially experiences the following conditions: weightlessness and landing. When the user touches the ground after falling, the user receives a relatively great impact force. In this case, a body of the user may be seriously injured, and the user needs to be aided in a timely manner to effectively reduce a risk of accidental injury or death. Based on this, the first preset fall parameter may be a motion parameter detected by the motion sensor when the wearable device 10 is weightless and receives relatively great impact force.

In some other cases, if the user is seriously injured after falling, the user cannot autonomously get up or move within a specific time period (for example, a preset time period), that is, a motion amplitude of the user within the preset time period is relatively small (for example, the motion amplitude is less than a preset amplitude threshold). In this case, the first preset fall parameter may be a motion parameter detected by the motion sensor when the wearable device 10 is weightless and receives relatively great impact force, and the motion amplitude within the preset time period is less than the preset amplitude threshold.

For example, the first preset fall parameter may be obtained by collecting statistics on motion parameters collected by motion sensors when a large quantity of users fall. The first preset fall parameter may be preconfigured in the wearable device 10. Alternatively, the first preset fall parameter is sent by the server 20 shown in FIG. 1A to the wearable device 10. For example, as shown in FIG. 3, before S301, the method in this embodiment may further include S300: the server 20 sends the first preset fall parameter to the wearable device 10.

It should be noted that, for a method in which the wearable device 10 determines whether the first motion parameter matches the first preset fall parameter, refer to a method for determining, during fall detection, whether a motion parameter matches the first preset fall parameter in the conventional technology. Details are not described in this embodiment. In this embodiment, that the wearable device 10 determines whether the first motion parameter matches the first preset fall parameter (namely, S302) is referred to as "first-layer detection" of fall detection.

For example, if the first motion parameter matches the first preset fall parameter, it indicates that the first motion parameter may be a motion parameter collected when the user "a" falls, that is, the user "a" may fall. In this case, the wearable device 10 may perform S303. If the first motion parameter does not match the first preset fall parameter, it indicates that the first motion parameter is not a motion parameter collected when the user "a" falls, that is, the user "a" does not fall. In this case, the wearable device may continue to collect a motion parameter of the user "a", that is, perform S301.

S303: The wearable device 10 obtains a fall confidence of the first motion parameter. The fall confidence is used to represent a probability that the first motion parameter is the motion parameter collected when the user "a" falls.

The wearable device 10 may determine the fall confidence based on a matching degree between the first motion parameter and a first preset interference parameter. Alternatively, the wearable device 10 may determine the fall confidence of the first motion parameter by using a first fall detection model. For a method in which the wearable device obtains the fall confidence of the first motion parameter, refer to detailed descriptions in the following embodiments. Details are not described herein.

S304: The wearable device 10 determines whether the fall confidence is greater than a preset confidence threshold.

A higher fall confidence of the first motion parameter indicates a higher probability that the first motion parameter is the motion parameter collected when the user "a" falls. A lower fall confidence of the first motion parameter indicates a lower probability that the first motion parameter is the motion parameter collected when the user "a" falls.

The preset confidence threshold may be preconfigured in the wearable device 10. Alternatively, the preset confidence threshold may be set by the user in the wearable device 10. For example, if a maximum value of the fall confidence of the motion parameter is 100, the preset confidence threshold may be any value such as 90, 85, 80, or 75. If a maximum value of the fall confidence of the motion parameter is 100%, the preset confidence threshold may be any value such as 90%, 85%, 80%, or 75%. If a maximum value of the fall confidence of the motion parameter is 10, the preset confidence threshold may be any value such as 9, 8.5, 8, or 7.5.

If the fall confidence is greater than the preset confidence threshold, it indicates that there is a relatively high probability that the first motion parameter is the motion parameter collected when the user "a" falls. In this case, to enable the fallen user "a" to be aided in a timely manner, the wearable device may perform S305 to send help-seeking information.

Optionally, if the fall confidence is greater than the preset confidence threshold, as shown in FIG. 3, the wearable device 10 may further perform S306: send a second message to the server 20. The second message includes the first motion parameter and first indication information. The first indication information is used to indicate that the first motion parameter is the motion parameter collected when the user falls. As shown in FIG. 3, after receiving the second message, the server 20 may perform S307 in response to the second message: update the first preset fall parameter by using the first motion parameter.

It may be understood that the server 20 may receive motion parameters sent by a large quantity of electronic devices (such as wearable devices) after the electronic devices determine that users fall and update the first preset fall parameter in the server 20 by using the motion parameters. Then, the server 20 may further send an updated first preset fall parameter to a plurality of electronic devices (for example, the wearable device 10) managed by the server 20. For example, the server 20 may periodically send the updated first preset fall parameter to the plurality of electronic devices (for example, the wearable device 10). The wearable device 10 performs fall detection by using the updated first preset fall parameter, so that accuracy of fall detection can be improved.

Alternatively, if the fall confidence is less than the preset confidence threshold, it indicates that there is a relatively low probability that the first motion parameter is the motion parameter collected when the user "a" falls. In this case, the wearable device may continue to collect a motion parameter of the user "a", that is, perform S301.

S305: The wearable device 10 sends the help-seeking information.

In some embodiments, S305 may be as follows: the wearable device 10 automatically calls a preset contact to send the help-seeking information.

The preset contact in this embodiment may be an emergency contact or a public rescue service preset in the wearable device 10. For example, a phone number of the public rescue service may be an emergency phone number (for example, 120) or an alarm phone number (for example, 110). The emergency contact may be preset by the user in the wearable device 10. For a method for setting the emergency contact by the user, refer to related descriptions in the following embodiments. Details are not described in this embodiment.

For example, the wearable device 10 is a smartwatch 400 worn by the user "a". It is assumed that preset emergency contacts in the smartwatch 400 include a son of the user "a", the wife of the user "a," and an emergency phone number 120. After determining that the fall confidence is greater than the preset confidence threshold (that is, the user "a" falls), the smartwatch 400 may automatically call any preset contact in the son of the user "a", the wife of the user "a", or the emergency phone number 120. For example, the smartwatch 400 may display a voice call interface 402 shown in FIG. 4(b), and call a daughter of the user "a", to send the help-seeking information.

It may be understood that if the user "a" is not seriously injured after falling, the user "a" has an autonomous behavior capability. In this case, the user "a" may expect to autonomously select an object for help-seeking. For example, when the fall is not serious, the user "a" may prefer to seek help from a family member or a friend rather than dialing the emergency phone number 120.

Based on this case, in some other embodiments, before sending the help-seeking information, the wearable device 10 may display a first interface including a plurality of contact options. Each contact option corresponds to one preset contact. The wearable device 10 may receive a selection operation (for example, a single-tap operation) performed by the user on any contact option in the first interface and call a preset contact corresponding to the contact option selected by the user, to send the help-seeking information.

Figures 4A, 4B:
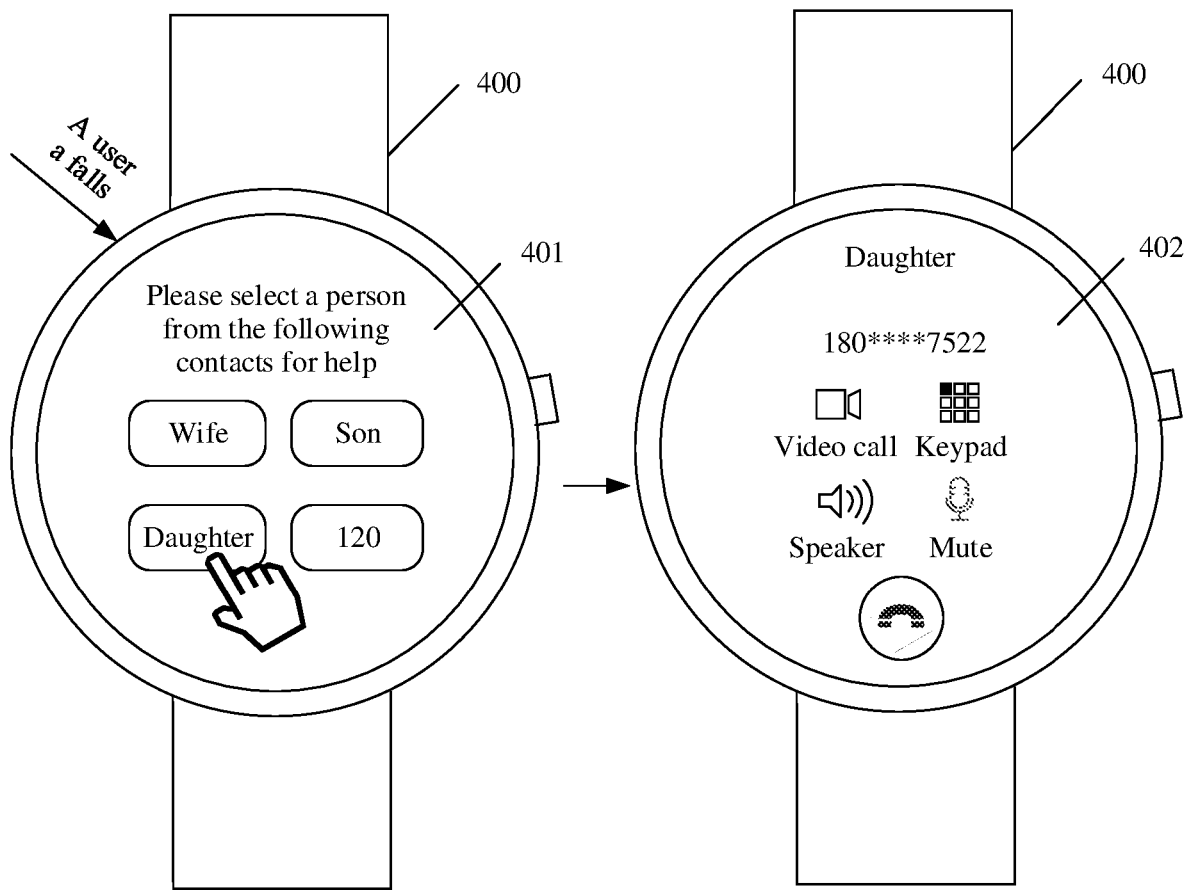
FIG. 4(a) and FIG. 4(b) are a schematic diagram depicting an example of a display interface according to an embodiment.

With reference to the foregoing example, after determining that the fall confidence is greater than the preset confidence threshold (that is, the user "a" falls), the smartwatch 400 may display a first interface 401 shown in FIG. 4(a). The first interface 401 includes the following contact options: "wife", "son", "daughter", and "120". The smartwatch 40 may receive a selection operation performed by the user "a" on the contact option "daughter". In response to the selection operation performed by the user on the contact option "daughter", the smartwatch 400 may display the voice call interface 402 shown in FIG. 4(b), and call the daughter of the user "a", to send the help-seeking information.

In some embodiments, after the wearable device 10 calls the preset contact corresponding to the contact option selected by the user (that is, requests voice communication with the contact selected by the user), if the voice communication is not answered within a first preset time period (for example, 1 minute, 50 seconds, 30 seconds, or 15 seconds), the wearable device 10 may automatically call another preset contact. For example, if the daughter of the user "a" still does not answer the call after the smartwatch 400 displays the voice call interface 402 shown in FIG. 4(b) for the first preset time period, the smartwatch 400 may automatically call the son or the wife of the user "a", or dial 120, to send the help-seeking information. In some other embodiments, if the voice communication is not answered within the first preset time period, the wearable device 10 may further automatically send a first message to one or more preset contacts.

In some other embodiments, S305 may be as follows: the wearable device 10 automatically sends the first message to the one or more preset contacts, where the first message includes the help-seeking information.

For example, the first message may be "I fell, come quickly to help me", "I fell, come quickly to take me to the hospital", or "I fell, seriously injured, come quickly to help me". The help-seeking information in the first message may be preconfigured in the wearable device 10. Alternatively, the help-seeking information may be set by the user in the wearable device 10. For a method for setting the help-seeking information by the user in the wearable device 10, refer to a method for setting a customized SMS message for automatic reply by the user in a mobile phone. Details are not described in this embodiment.

For example, the wearable device 10 may send the first message to the one or more preset contacts through one or more communication applications. The one or more communication applications may be communication applications installed in the wearable device 10. The one or more communication applications are applications that are installed in the wearable device 10 and that can communicate with another device (for example, a mobile phone of a preset contact). For example, the communication application may be a messaging application, Email, iMessage, WeChat, QQ, or Alipay, or the like.

It should be noted that in this embodiment, the communication application runs in the background of the wearable device 10, so that when the user "a" falls, the wearable device 10 can directly invoke the communication application to send the first message to the one or more preset contacts. Alternatively, the user logged in to the communication application on the wearable device 10, and the wearable device 10 stores login information (for example, an account and a login password) of the communication application, so that the wearable device 10 can start the communication application when determining that the user "a" falls and send the first message to the one or more preset contacts through the communication application after starting the communication application.

It may be understood that currently, a public rescue service has registered an official account on each communication application. In this embodiment, the wearable device 10 may send the first message to an official account of the public rescue service on the communication application through the communication application.

In some embodiments, the wearable device 10 may automatically send the first message to the one or more preset contacts in the wearable device 10 through any communication application (for example, WeChat). For example, the communication application is WeChat. With reference to the foregoing example, after determining that the fall confidence is greater than the preset confidence threshold (that is, the user "a" falls), the smartwatch 400 may automatically send a WeChat message to one or more preset contacts in the son of the user "a", the daughter of the user "a", the wife of the user "a", or the emergency phone number 120. The WeChat message includes the help-seeking information.

In some other embodiments, to ensure that the user "a" can be aided in a timely manner after falling, the wearable device 10 may automatically send the first message to the one or more preset contacts in the wearable device 10 through a plurality of communication applications (for example, WeChat and Messaging). With reference to the foregoing example, after determining that the user "a" falls, the smartwatch 400 may automatically send a WeChat message and an SMS message to one or more preset contacts in the son of the user "a", the daughter of the user "a", the wife of the user "a", or the emergency phone number 120. The WeChat message and the SMS message include the help-seeking information.

In some embodiments, to enable a rescuer (for example, a family member or a friend of the user "a", or a public rescue service worker) to accurately find the user "a" in a timely manner, the first message may further include geographical location information of the wearable device 10. The wearable device 10 includes a positioning module, for example, a GPS positioning module. The wearable device 10 may obtain the geographical location information of the wearable device 10 by using the positioning module.

Further, considering that the first message may not be noticed in a timely manner, when sending the first message, the wearable device 10 may further call the preset contact for help-seeking. In this way, not only the help-seeking of the user "a" can be noticed in a timely manner, but also the rescuer can accurately locate the fallen user "a" based on the geographical location information in the first message and go to help in a timely manner.

Optionally, after sending the first message to the one or more preset contacts, the wearable device 10 may send first prompt information. The first prompt information is used to prompt the user "a" that the wearable device 10 has sent a help-seeking message. For example, the first prompt information may be "already ask the emergency contact (through WeChat, Messaging, or another instant messaging application) to help you".

For example, the wearable device 10 may display the first prompt information on a display (for example, a touchscreen). For example, after sending the first message to the one or more preset contacts, the wearable device 10 may display first prompt information 506 shown in FIG. 5(d). Alternatively, the wearable device 10 may play speech information corresponding to the first prompt information.

It may be understood that, after falling, the user "a" may expect to autonomously select an object for help-seeking. For example, when the fall is not serious, the user "a" may prefer to seek help from a family member or a friend rather than dialing the emergency phone number 120. Based on this case, in this embodiment, before sending the first message, the wearable device 10 may display a first interface including a plurality of contact options. Each contact option corresponds to one preset contact. The wearable device 10 may receive a selection operation (for example, a single-tap operation) performed by the user on one or more contact options in the first interface, and send, through one or more communication applications, the first message to one or more preset contacts corresponding to the one or more contact options selected by the user. Correspondingly, the plurality of contact options displayed in the first interface are contact options of preset contacts in the one or more communication applications.

It should be noted that if the wearable device 10 does not receive a selection operation of the user in the first interface within a second preset time period, the wearable device 10 may automatically call any preset contact, or send the first message to one or more preset contacts.

For example, the communication application is WeChat. It is assumed that a mobile phone 500 shown in FIG. 5(b) is a mobile phone of the son of the user "a", and a WeChat account of the son of the user "a" is used to log in to WeChat in the mobile phone 500; and a mobile phone 600 shown in FIG. 5(c) is a mobile phone of the daughter of the user "a", and a WeChat account of the daughter of the user "a" is used to log in to WeChat in the mobile phone 600. After determining that the user "a" falls, the smartwatch 400 may display a first interface 501 shown in FIG. 5(a). The first interface 501 includes a plurality of contact options, such as contact options "wife", "son", "daughter", and "120". The first interface 501 may further include an "OK" button and a "Cancel" button. The "Cancel" button is used to trigger the smartwatch 400 to cancel sending the help-seeking information. The "OK" button is used to trigger the smartwatch 400 to send the first message to a contact corresponding to a contact option selected by the user.

Figure 5A:
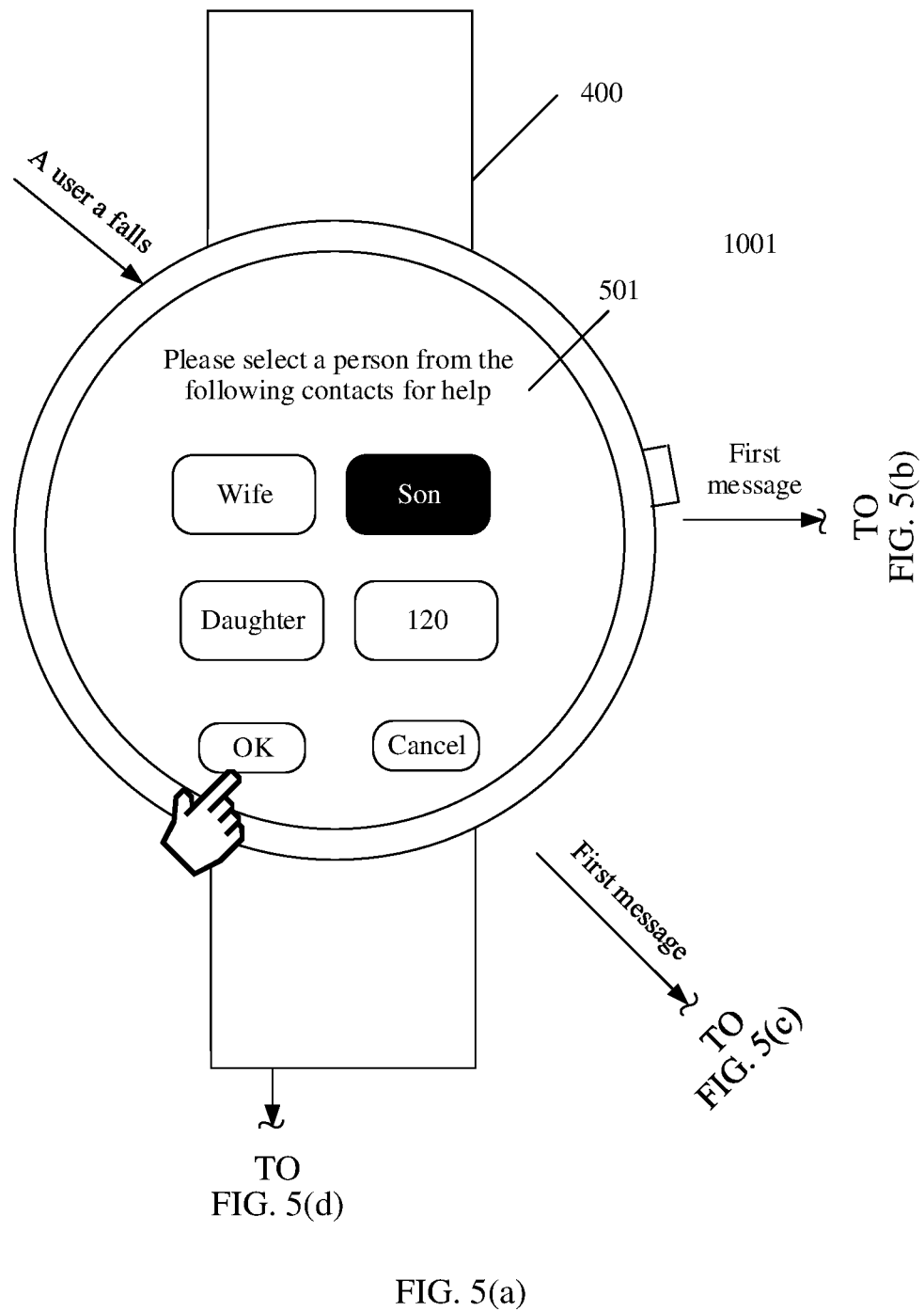
FIG. 5(a) to FIG. 5(d) are a schematic diagram depicting an example of another display interface according to an embodiment.
Figure 5B:
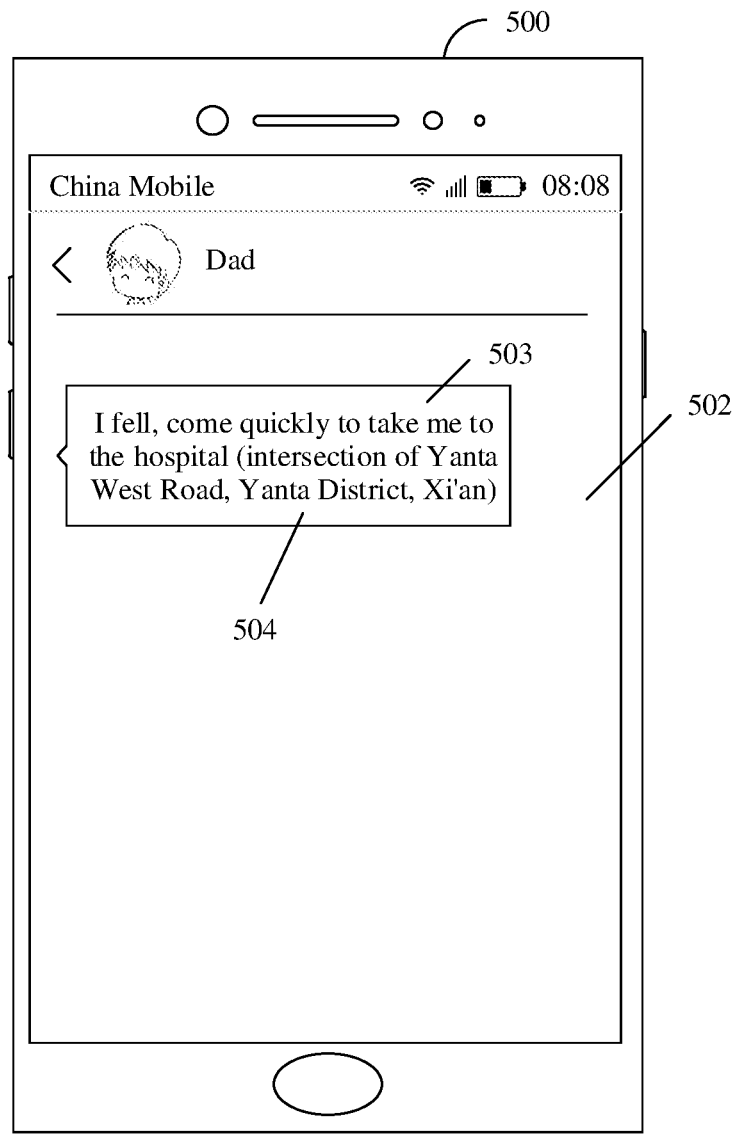
Figure 5C:
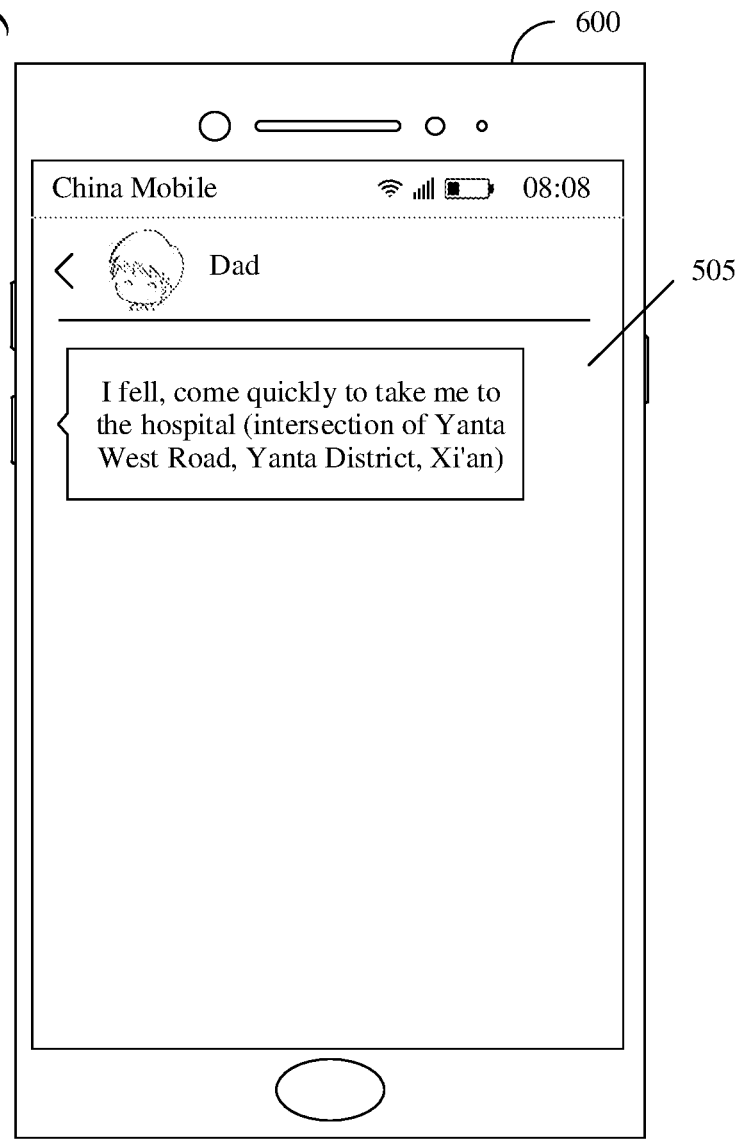
Figure 5D:
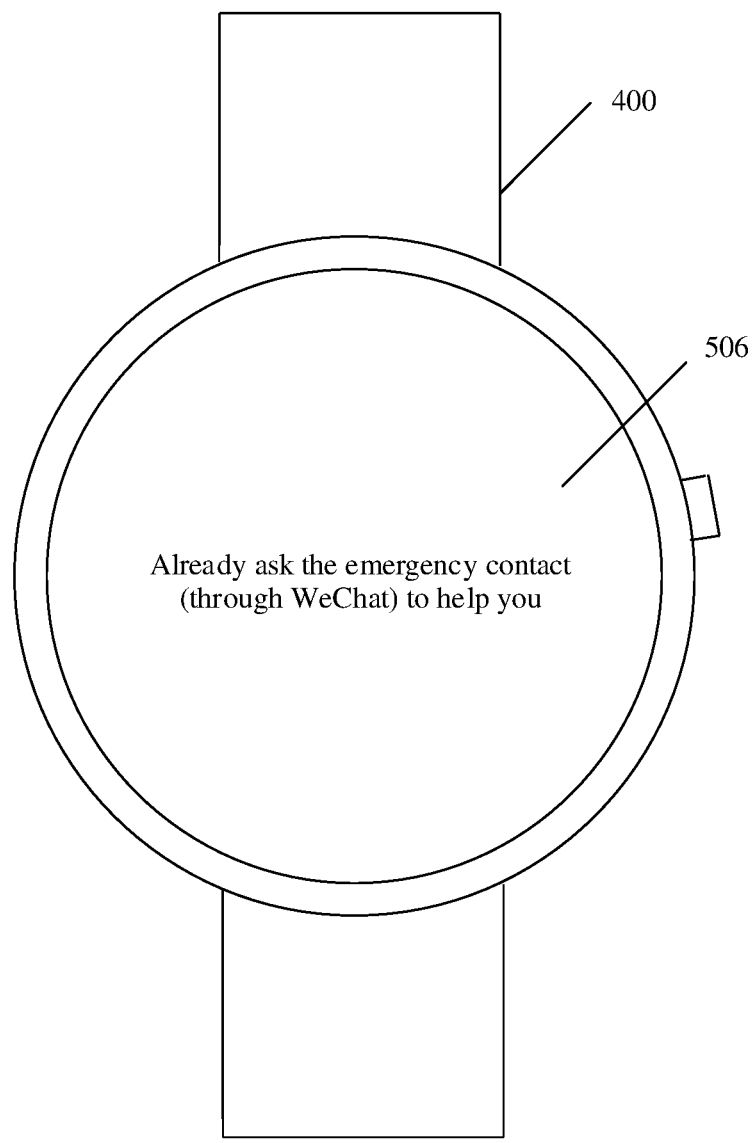

The contact options "son" and "daughter" in FIG. 5(a) are selected by the user. In response to a tap operation (for example, a single-tap operation) performed by the user on the "OK" button, the smartwatch 400 may send the first message to the son (that is, the mobile phone 500) and the daughter (that is, the mobile phone 600) of the user "a" through WeChat. After receiving the first message, the mobile phone 500 may display a WeChat chat interface 502 in FIG. 5(b) in response to a user operation. After receiving the first message, the mobile phone 600 may display a WeChat chat interface 505 in FIG. 5(c) in response to a user operation. As shown in FIG. 5(b), the WeChat chat interface 502 may include help-seeking information 503 and geographical location information 504. For example, the help-seeking information 503 may be "I fell, come quickly to take me to the hospital", and the geographical location information 504 may be "intersection of Yanta West Road, Yanta District, Xi'an". After sending the first message, the wearable device 10 may further display the first prompt information 506 shown in FIG. 5(d), for example, "already ask the emergency contact (through WeChat) to help you".

Figure 6A:
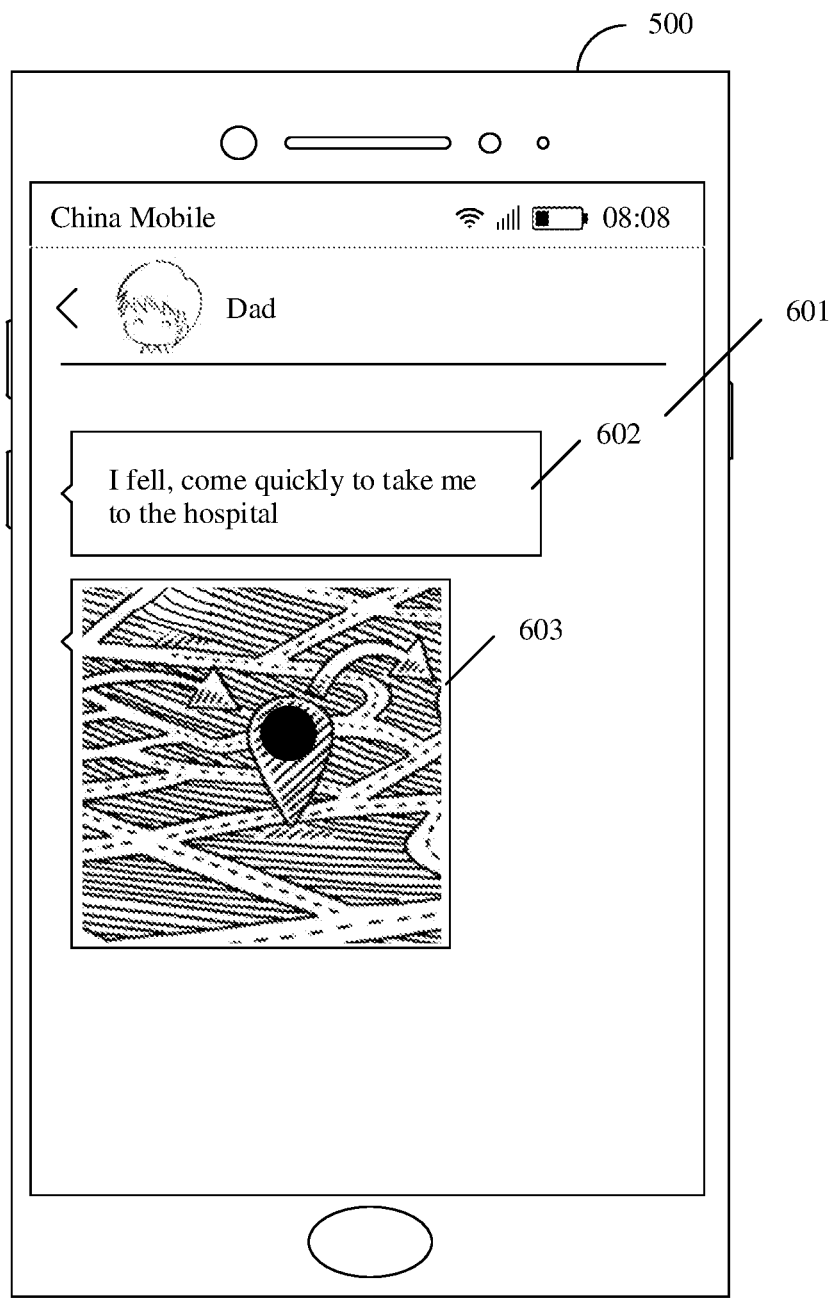
FIG. 6A is a schematic diagram depicting an example of another display interface according to an embodiment.

Optionally, the geographical location information may be a link of a geographical location of the user "a". For example, as shown in FIG. 6A, the mobile phone 500 may display a WeChat chat interface 601. The WeChat chat interface 601 includes help-seeking information 602 and geographical location information 603. The geographical location information 603 is a link of a geographical location of the user "a". In response to a tap operation (for example, a single-tap operation) performed by a user on the geographical location information 603, the mobile phone 500 may invoke a map application (for example, Baidu Map) in the mobile phone 500 to accurately determine the geographical location of the user "a" (not shown in the figure).

In some cases, if the user "a" is seriously injured after falling, the user needs to be aided in a timely manner, to effectively reduce a risk of accidental injury or death. However, after the wearable device 10 makes the call or sends the first message for help-seeking, even if the rescuer can receive the help-seeking of the user "a" in a timely manner, the rescuer may not be able to aid the user "a" in a timely manner. In this case, because an optimal aid time is missed, life of the user "a" may be in danger, or a body of the user "a" may be irreversibly harmed. For example, the rescuer may not be able to aid the user "a" in a timely manner because the rescuer cannot reach, in a timely manner, a location at which the user "a" falls.

In some other embodiments, to increase a probability that the user "a" can be aided in a timely manner after the user "a" falls, the wearable device 10 may further play a help-seeking speech or an alarm sound. In this way, after the user "a" falls, people around can find the fallen user "a" in a timely manner and aid the user "a" in a timely manner.

For example, the help-seeking speech may be "help, help", "help me, help me", or "an old man fell, please help". For example, the alarm sound may be "di di di", "du du du", or an alarm sound played when an ambulance executes an aid task. Optionally, the wearable device 10 may play the help-seeking speech at a maximum play volume of the wearable device 10 (for example, of a speaker of the wearable device).

In some other embodiments, after determining that the user "a" falls, the wearable device 10 may enable a speech control function of the wearable device 10. After the wearable device 10 enables the speech control function, the wearable device may receive speech data sent by the user and perform a corresponding event. For example, a voice assistant may be installed in the wearable device 10. Usually, the wearable device 10 may monitor speech data. When speech data (for example, a wake-up word "xiao E, xiao E") is detected, whether the speech data matches a wake-up word may be determined. If the speech data matches the wake-up word, the wearable device 10 may enable the voice assistant. However, in this embodiment, after determining that the user "a" falls, the wearable device 10 may enable the voice assistant. The voice assistant is an important application of an electronic device (for example, the wearable device 10). The voice assistant may perform intelligent conversation and instant question and answer-based intelligent interaction with a user. In addition, the voice assistant may further identify a speech command of the user and enable the wearable device 10 to perform an event corresponding to the speech command.

In this embodiment, after determining that the user "a" falls, the wearable device 10 may collect speech data, and perform a speech control event corresponding to the speech data (that is, a speech command). For example, the wearable device 10 may collect the speech data by using a microphone, receive a speech command of the user by using the voice assistant, and enable the wearable device 10 to perform an event corresponding to the speech command. In this way, after falling, the user "a" can control, by using a speech, the wearable device 10 to send the help-seeking information. For example, the user "a" may say speech data "call my son", "send a WeChat message to tell my daughter that I fell", or "dial 120".

In this embodiment, a preset contact does not need to be preconfigured or set in the wearable device 10. After falling, the user "a" may control, by using the speech data, the wearable device 10 to send the help-seeking information to a contact specified by the user. Alternatively, in this embodiment, a preset contact may be preconfigured or set in the wearable device 10. In this case, after the user "a" falls, provided that the user "a" sends a preset speech command (that is, speech data), such as "fall", "falling", "help", or "help me", the wearable device 10 can send the help-seeking information in any one of the foregoing help-seeking manners.

When the user "a" falls, the display (for example, a touchscreen) of the wearable device 10 may fail to work normally due to relatively great impact force. In some of the foregoing implementations, if the display (for example, a touchscreen) of the wearable device 10 cannot work normally, the user "a" cannot control the wearable device 10 to send the help-seeking information. However, in this embodiment, after falling, the user "a" can normally control, by using speech data, the wearable device 10 to send the help-seeking information.

Figure 6B:
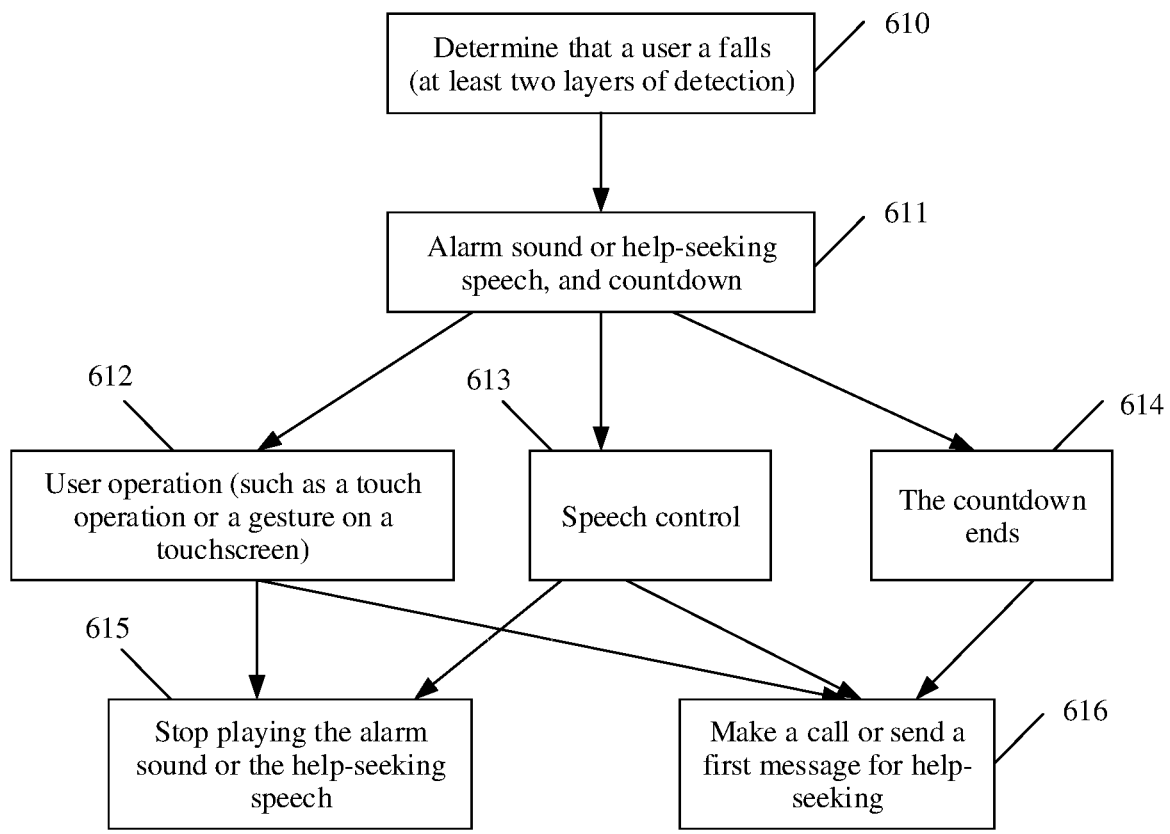
FIG. 6B is a schematic diagram depicting logic of sending help-seeking information according to an embodiment.

In some other embodiments, after determining that the user "a" falls (that is, performing 610 shown in FIG. 6B), the wearable device 10 may play the help-seeking speech or the alarm sound, and start a timer to count down (that is, perform 611 shown in FIG. 6B). Timing duration for the timer to count down is a third preset time period. For example, the third preset time period may be any time length such as 1 minute, 90 seconds, 2 minutes, 3 minutes, or 5 minutes.

If the user "a" is not seriously injured after falling, and can autonomously seek medical care, the user "a" may control the wearable device 10 to stop playing the help-seeking speech or the alarm sound. For example, the user may control, within the third preset time period (that is, before the countdown ends), the wearable device 10 to stop playing the help-seeking speech or the alarm sound.

For example, if the wearable device 10 receives a first operation (that is, performing 612 or 613 shown in FIG. 6B) of the user within the third preset time period, in response to the first operation, the wearable device 10 may stop playing the help-seeking speech or the alarm sound (that is, perform 615 shown in FIG. 6B). For example, the first operation may be a touch operation or a gesture, such as an S-shaped gesture, entered by the user on the display (for example, a touchscreen) of the wearable device 10. For another example, the first operation may be a first tap operation, such as a double-tap operation, performed by the user on the wearable device 10. For still another example, after determining that the user "a" falls, the wearable device 10 may enable the speech control function of the wearable device 10. The first operation is speech data (that is, a speech command), for example, "stop playing", sent by the user for controlling the wearable device 10 to stop playing the alarm sound or the help-seeking speech.

Alternatively, if the user "a" is seriously injured after falling, and cannot autonomously seek medical care, but still has a behavior capability, the user "a" may control the wearable device 10 to send the help-seeking information in a help-seeking manner selected by the user.

For example, if the wearable device 10 receives a second operation (that is, performing 612 or 613 shown in FIG. 6B) of the user within the third preset time period, in response to the second operation, the wearable device 10 may call a preset contact or send the first message to a preset contact (that is, perform 616 shown in FIG. 6B). The second operation is different from the first operation. For example, the second operation may be a touch operation or a gesture, such as a √-shaped gesture, entered by the user on the display (for example, a touchscreen) of the wearable device 10. For another example, the second operation may be a second tap operation, such as a triple-tap operation, performed by the user on the wearable device 10. For still another example, after determining that the user "a" falls, the wearable device 10 may enable the speech control function of the wearable device 10. The second operation is that the user sends speech data such as "call my son", "send a WeChat message to tell my daughter that I fell", or "dial 120".

Alternatively, if the user "a" is seriously injured after falling, and cannot operate the wearable device 10, the wearable device 10 may automatically use any one of the foregoing help-seeking manners after the third preset time period (that is, after the countdown ends), or seek help with reference to at least two help-seeking manners (that is, perform 616 shown in FIG. 6B).

It should be noted that in this embodiment, a manner in which the wearable device 10 sends the help-seeking information (that is, a help-seeking manner) includes, but is not limited to, the foregoing manners. The wearable device 10 may seek help in any one of the foregoing help-seeking manners, or with reference to at least two help-seeking manners. The manner in which the wearable device 10 sends the help-seeking information is not limited in this embodiment.

In this embodiment, after determining that the first motion parameter matches the first preset fall parameter (that is, determining that the user may fall), the wearable device 10 may further determine whether the fall confidence is greater than the preset confidence threshold. In other words, the wearable device 10 may determine, through double detection, whether the user falls. In this way, accuracy of fall detection performed by the wearable device 10 can be improved, and a probability of mistakenly triggering automatic help-seeking of the wearable device 10 can be reduced.

Figure 7:
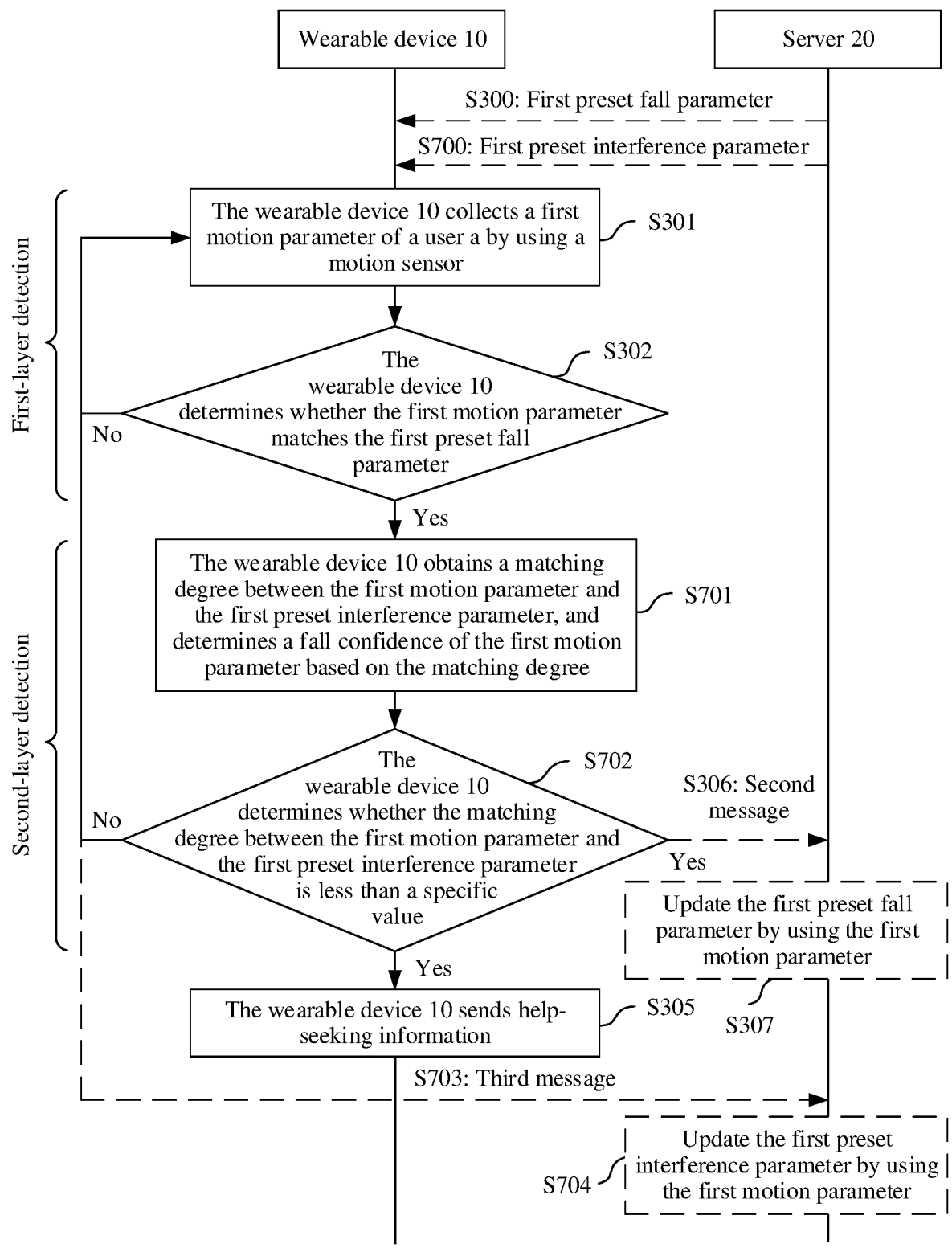
FIG. 7 is a flowchart depicting another fall detection-based help-seeking method according to an embodiment.

In some embodiments, the wearable device 10 may determine the fall confidence of the first motion parameter based on the matching degree between the first motion parameter and the first preset interference parameter. As shown in FIG. 7, S303 shown in FIG. 3 may be replaced with S701, and S304 may be replaced with S702.

S701: The wearable device 10 obtains the matching degree between the first motion parameter and the first preset interference parameter and determines the fall confidence of the first motion parameter based on the matching degree.

The first preset interference parameter is a motion parameter collected when the user performs a preset interference action. The preset interference action may be slapping a table, waving a hand, going downstairs, sitting down, lying down, nodding, shaking a head, kicking, running, jumping, and the like by the user. When the user performs the preset interference action, the motion sensor of the wearable device 10 may collect the first preset interference parameter.

In this embodiment, a lower matching degree between the first motion parameter and the first preset interference parameter indicates a higher fall confidence. A higher matching degree between the first motion parameter and the first preset interference parameter indicates a lower fall confidence.

For example, a sum of the matching degree a and the fall confidence b is a fixed value. For example, a+b=m. Herein, m is any value, such as 1, 2, or 3. For example, m=1. When the matching degree a=30%, the fall confidence b=1 −30%=70%. The preset confidence threshold may be any value such as 90%, 85%, 80%, or 75%.

For another example, the matching degree a is inversely proportional to the fall confidence b. For example, a×b=n. Herein, n is any value, such as 1, 2, 10, or 50. For example, n=10. When the matching degree a=20, the fall confidence b=n/a=10/20=1/2=50%. The preset confidence threshold may be 90%, 85%, 80%, 75%, or the like.

In this embodiment, that the wearable device 10 determines whether the fall confidence is greater than the preset confidence threshold (that is, S304) may also be considered that the wearable device 10 performs S702.

S702: The wearable device 10 determines whether the matching degree between the first motion parameter and the first preset interference parameter is less than a specific value.

It may be understood that a lower matching degree indicates a higher fall confidence, and a higher matching degree indicates a lower fall confidence. Therefore, if the fall confidence is greater than the preset confidence threshold (that is, the fall confidence is relatively high), the matching degree is relatively low (for example, less than the specific value). When the matching degree is less than the specific value, it indicates that there is a relatively low probability that the first motion parameter is the first preset interference parameter, and there is a relatively high probability that the motion parameter is the parameter collected when the user "a" falls, that is, there is a relatively high probability that the user "a" falls. In this case, the wearable device 10 may send the help-seeking information (that is, perform S305). It should be noted that in this embodiment, S701 and S702 performed by the wearable device 10 is referred to as "second-layer detection" of fall detection. Through the "second-layer detection", the wearable device 10 can exclude mistaken triggering caused by the preset interference action on automatic help-seeking of the wearable device 10.

For example, the first preset interference parameter may be obtained by collecting statistics on motion parameters collected by motion sensors when a large quantity of users perform the preset interference action. The first preset interference parameter may be preconfigured in the wearable device 10. Alternatively, the first preset interference parameter is sent by the server 20 shown in FIG. 1A to the wearable device 10. For example, as shown in FIG. 7, the method in this embodiment may further include S700: the server 20 sends the first preset interference parameter to the wearable device 10.

Optionally, if the fall confidence is less than or equal to the preset confidence threshold (or the matching degree between the first motion parameter and the first preset interference parameter is greater than or equal to the specific value), it indicates that the user "a" does not fall, and the first motion parameter is the first preset interference parameter. In this case, as shown in FIG. 7, the wearable device 10 may perform S703: send a third message to the server 20. The third message includes the first motion parameter and second indication information. The second indication information is used to indicate that the first motion parameter is not the motion parameter collected when the user falls. As shown in FIG. 7, after receiving the third message, the server 20 may perform S704 in response to the third message: update the first preset interference parameter by using the first motion parameter.

It may be understood that the server 20 may receive motion parameters sent by a large quantity of electronic devices (such as wearable devices) after the electronic devices determine that users do not fall and update the first preset interference parameter in the server 20 by using the motion parameters. Then, the server 20 may further send an updated first preset interference parameter to a plurality of electronic devices (for example, the wearable device 10) managed by the server 20. For example, the server 20 may periodically send the updated first preset interference parameter to the plurality of electronic devices (for example, the wearable device 10). The wearable device 10 performs fall detection by using the updated first preset interference parameter, so that accuracy of fall detection can be improved.

In this embodiment, after determining that the first motion parameter matches the first preset fall parameter (that is, performing the "first-layer detection"), the wearable device 10 may further determine whether the first motion parameter is the motion parameter collected when the user performs the preset interference action (that is, perform the "second-layer detection"), to exclude mistaken triggering caused by the preset interference action on automatic help-seeking of the wearable device 10. In other words, the wearable device 10 may determine, through double detection, that is, the "first-layer detection" and the "second-layer detection", whether the user falls. In this way, accuracy of fall detection performed by the wearable device 10 can be improved, and a probability of mistakenly triggering automatic help-seeking of the wearable device 10 can be reduced.

In some other embodiments, the wearable device 10 may store model code of one or more fall detection models. The one or more fall detection models include the first fall detection model. The first fall detection model is used to determine a fall confidence of a motion parameter (for example, the first motion parameter). The first fall detection model is an artificial intelligence (AI) model obtained by performing sample training by using a plurality of second motion parameters. Alternatively, the first fall detection model is an AI model obtained by performing sample training by using a plurality of second motion parameters and a plurality of third motion parameters.

The plurality of second motion parameters are motion parameters collected when a plurality of users fall. The plurality of third motion parameters are motion parameters collected when the plurality of users perform the foregoing preset interference action.

The first fall detection model may be sent by the server 20 shown in FIG. 1A to the wearable device 10. The first fall detection model may be an AI model obtained by the server 20 by performing sample training on the plurality of second motion parameters (or the plurality of second motion parameters and the plurality of third motion parameters) by using a deep learning algorithm. For a specific method in which the server 20 performs sample training to obtain the first fall detection model, refer to a model training method in the conventional technology. Details are not described in this embodiment.

Figure 8:
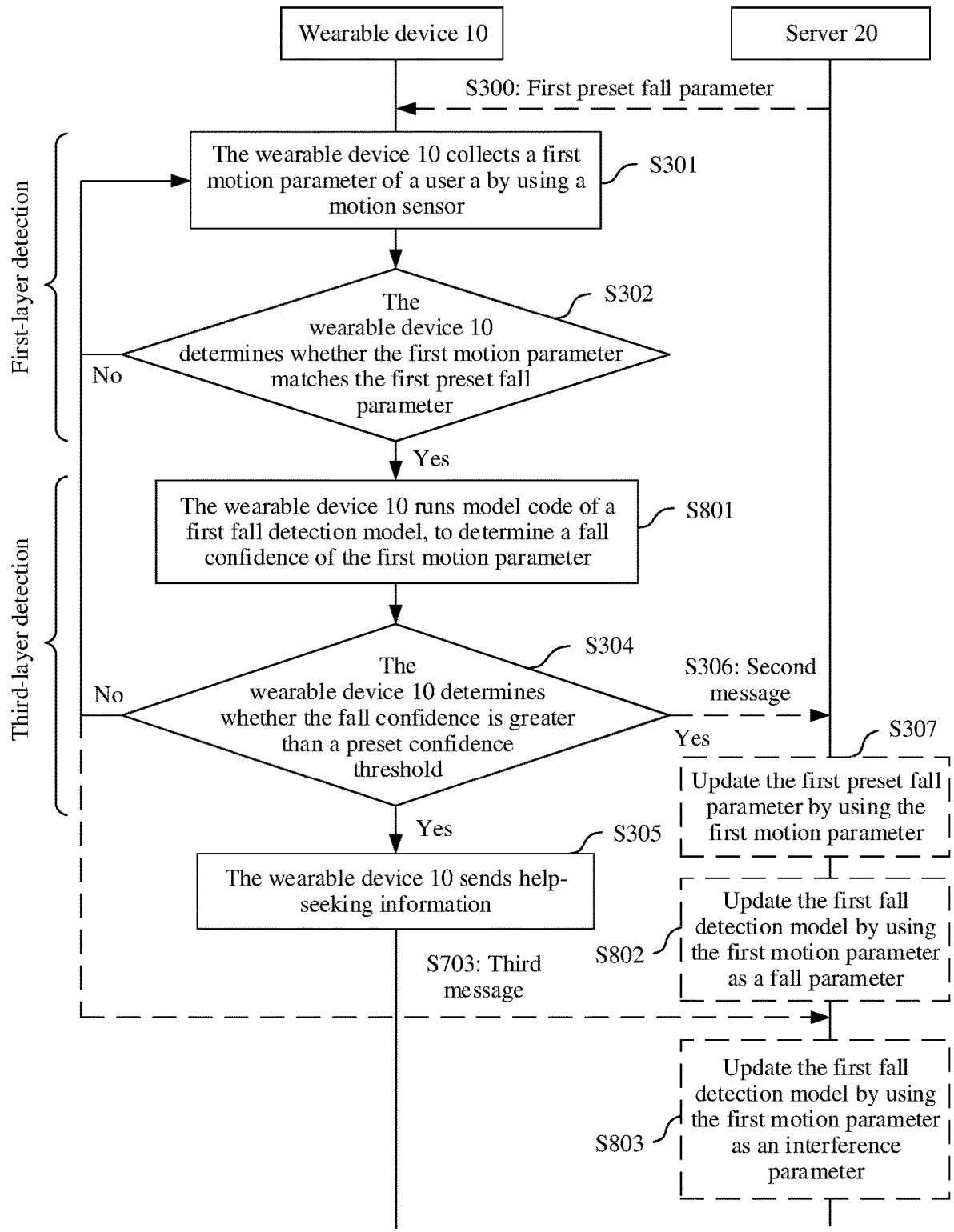
FIG. 8 is a flowchart depicting another fall detection-based help-seeking method according to an embodiment.

In this embodiment, the wearable device 10 may determine the fall confidence of the first motion parameter by using the first fall detection model. As shown in FIG. 8, S303 shown in FIG. 3 may be replaced with S801.

S801: The wearable device 10 runs the model code of the first fall detection model, to determine the fall confidence of the first motion parameter.

The first fall detection model obtained through sample training has a capability of determining a fall confidence of a motion parameter. Therefore, the wearable device 10 may run the model code of the first fall detection model, and use the first motion parameter as input, to obtain the fall confidence of the first motion parameter.

It may be understood that the first fall detection model is an AI model that is obtained through training with a large quantity of samples and that has a capability of determining a fall confidence of a motion parameter. Therefore, compared with a fall confidence obtained by comparing or performing matching on the first motion parameter and a preset parameter (for example, the first preset interference parameter), the fall confidence determined by running the model code of the first fall detection model is more accurate.

It should be noted that in this embodiment, S801 and S304 performed by the wearable device 10 are referred to as "third-layer detection" of fall detection. Compared with the "second-layer detection", the "third-layer detection" is more accurate, and therefore, accuracy of fall detection can be improved.

Optionally, after S304, if the fall confidence of the first motion parameter is greater than the preset confidence threshold, the wearable device 10 may perform S306 to send the first motion parameter and the first indication information to the server 20. After receiving the first motion parameter and the first indication information, in response to the first indication information, the server 20 may perform S307 to update the first preset fall parameter by using the first motion parameter and may further perform S802: update the first fall detection model by using the first motion parameter as a fall parameter. That the server 20 updates the first fall detection model by using the first motion parameter as a fall parameter means that the server performs model training by using the first motion parameter as a training sample, so that the first fall detection model can learn of a capability of determining that the first motion parameter is motion data collected when the user falls.

If the fall confidence of the first motion parameter is less than or equal to the preset confidence threshold, the wearable device 10 may perform S702 to send the first motion parameter and the second indication information to the server 20. After receiving the first motion parameter and the second indication information, in response to the second indication information, the server 20 may perform S803: update the first fall detection model by using the first motion parameter as an interference parameter. That the server 20 updates the first fall detection model by using the first motion parameter as an interference parameter means that the server 20 performs model training by using the first motion parameter as a training sample, so that the first fall detection model can learn of a capability of recognizing that the first motion parameter is not motion data collected when the user falls.

It may be understood that after updating the first fall detection model, the server 20 may generate model code of an updated first fall detection model. Then, the server 20 may send the model code of the updated first fall detection model to a plurality of electronic devices (for example, the wearable device 10) managed by the server 20. For example, the server 20 may periodically send the model code of the updated first fall detection model to the plurality of electronic devices (for example, the wearable device 10). The wearable device 10 replaces the model code that is stored in the wearable device 10 and that is of the first fall detection model with the model code of the updated first fall detection model. The wearable device 10 performs fall detection by using the updated first fall detection model, so that accuracy of fall detection can be improved.

In this embodiment, the wearable device 10 may determine, through double detection, that is, the "first-layer detection" and the "third-layer detection", whether the user falls. In this way, accuracy of fall detection performed by the wearable device 10 can be improved, and a probability of mistakenly triggering automatic help-seeking of the wearable device 10 can be reduced.

Figure 9A:
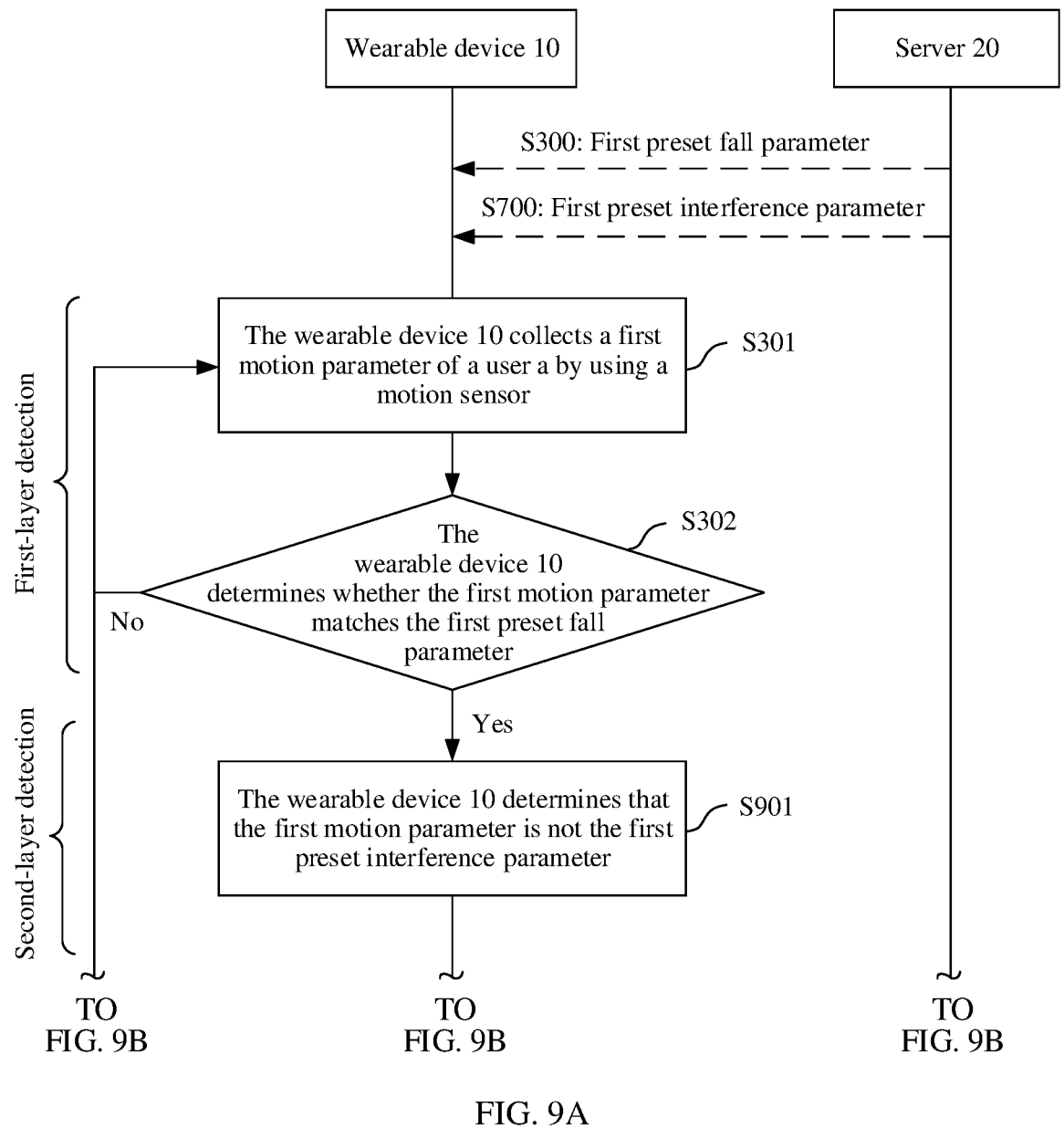
FIG. 9A and FIG. 9B are a flowchart depicting another fall detection-based help-seeking method according to an embodiment.
Figure 9B:
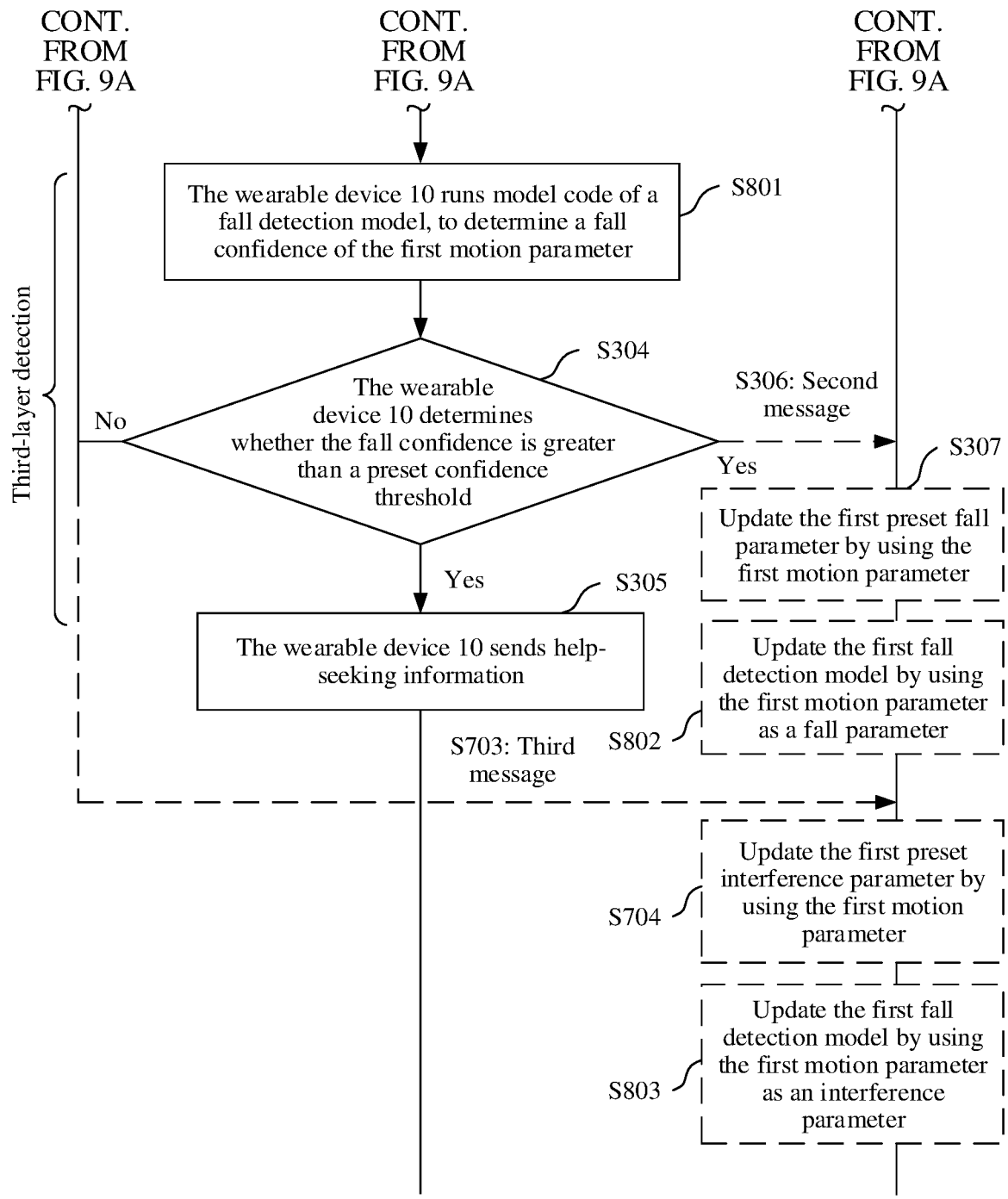

To further improve accuracy of fall detection performed by the wearable device 10, in some other embodiments, the wearable device 10 may determine, through triple detection, that is, the "first-layer detection", the "second-layer detection", and the "third-layer detection", whether the user falls. For example, as shown in FIG. 9A and FIG. 9B, before S801 shown in FIG. 8, the method in this embodiment may further include S901.

S901: The wearable device 10 determines that the first motion parameter is not the first preset interference parameter.

The wearable device 10 may determine whether a matching degree between the first motion parameter and the first preset interference parameter is less than a specific value. If the matching degree between the first motion parameter and the first preset interference parameter is less than the specific value, the wearable device 10 may determine that the first motion parameter is not the first preset interference parameter. For a specific method in which the wearable device 10 determines whether the matching degree between the first motion parameter and the first preset interference parameter is less than the specific value, refer to the detailed descriptions in S702. Details are not described in this embodiment.

In this embodiment, after determining that the first motion parameter matches the first preset fall parameter (that is, performing the "first-layer detection"), the wearable device 10 may determine whether the first motion parameter is the motion parameter collected when the user performs the preset interference action (that is, perform the "second-layer detection"), to exclude mistaken triggering caused by the preset interference action on automatic help-seeking of the wearable device 10, and then perform the "third-layer detection" by using the fall detection model. In other words, the wearable device 10 may determine, through triple detection, that is, the "first-layer detection", the "second-layer detection", and the "third-layer detection", whether the user falls. In this way, accuracy of fall detection performed by the wearable device 10 can be improved, and a probability of mistakenly triggering automatic help-seeking of the wearable device 10 can be reduced.

In some other embodiments, after S304, even if the fall confidence is less than or equal to the preset confidence threshold, the wearable device 10 does not immediately perform S301, but determines whether the user "a" makes a preset moaning sound or crying sound, and whether a heart rate of the user "a" is abnormal. For example, after S304, if the fall confidence is less than or equal to the preset confidence threshold, the method in this embodiment may further include S1001 to S1003. Before S1001, the method in this embodiment may further include S1000.

Figure 10A:
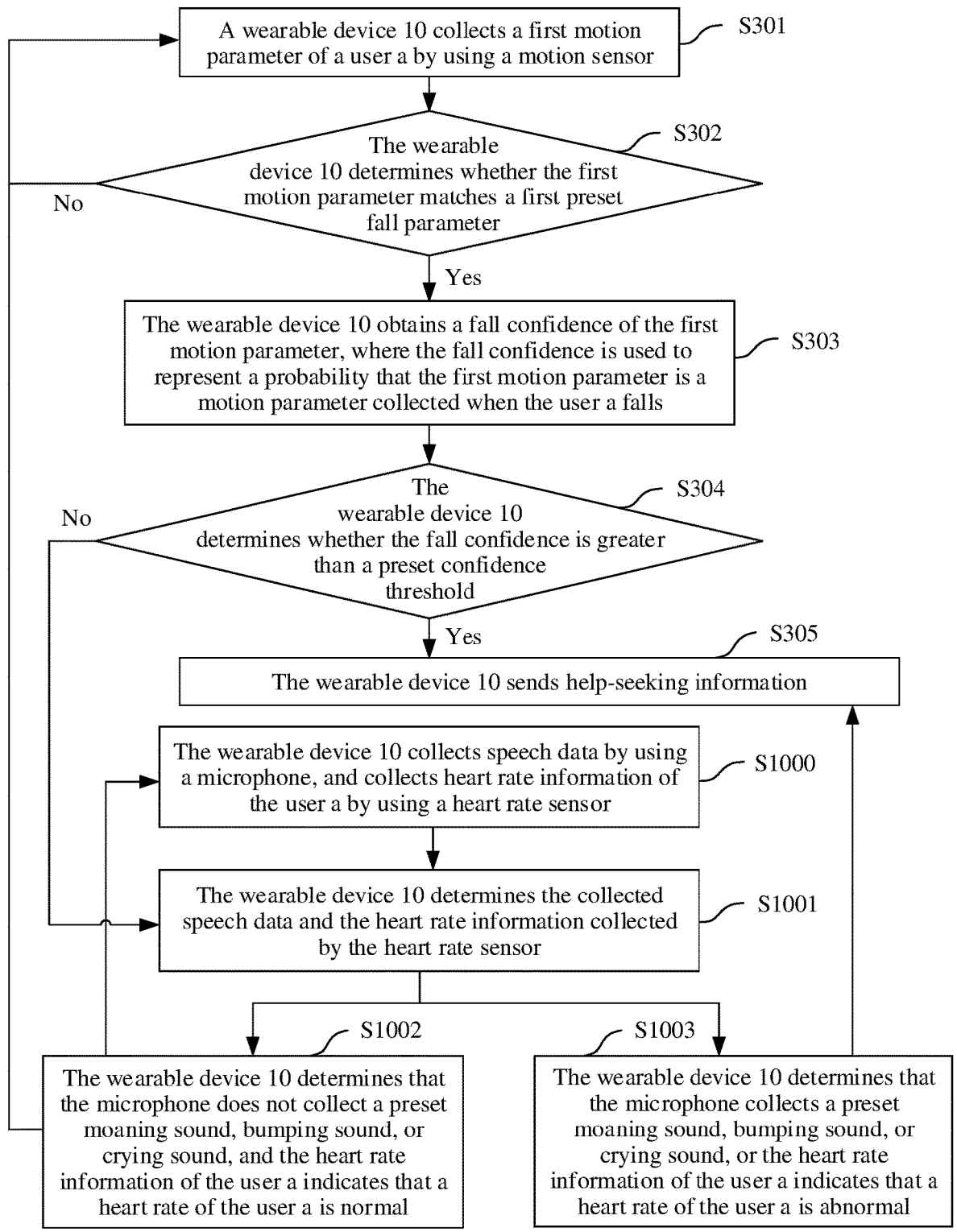
FIG. 10A is a flowchart depicting another fall detection-based help-seeking method according to an embodiment.

For example, with reference to FIG. 3, and as shown in FIG. 10A, after S304, if the fall confidence is less than or equal to the preset confidence threshold, the method in this embodiment may further include S1001 to S1003.

S1001: The wearable device 10 determines collected speech data and heart rate information collected by a heart rate sensor.

For example, the heart rate information of the user "a" may be a quantity of heartbeats per minute of the user "a". As shown in FIG. 10A, before S1001, the method in this embodiment may further include S1000: the wearable device 10 collects the speech data by using a microphone, and collects the heart rate information of the user "a" by using the heart rate sensor.

S1002: The wearable device 10 determines that the microphone does not collect a preset moaning sound, bumping sound, or crying sound, and the heart rate information of the user "a" indicates that the heart rate of the user "a" is normal.

That the heart rate information of the user "a" indicates that the heart rate of the user "a" is normal is as follows: the heart rate information of the user "a" indicates that the quantity of heartbeats per minute of the user "a" falls within a value interval (m1, m2). Herein, m1 is a first quantity of heartbeats, and m2 is a second quantity of heartbeats. m2 is greater than m1. The first quantity m1 of heartbeats is a minimum quantity of heartbeats per minute of a normal person, and the second quantity m2 of heartbeats is a maximum quantity of heartbeats per minute of a normal person. For example, m1=60, and m2=100.

S1003: The wearable device 10 determines that the microphone collects a preset moaning sound, bumping sound, or crying sound, or the heart rate information of the user "a" indicates that the heart rate of the user "a" is abnormal.

That the heart rate information of the user "a" indicates that the heart rate of the user "a" is abnormal is as follows: the heart rate information of the user "a" indicates that the quantity of heartbeats per minute of the user "a" is less than the first quantity of heartbeats or greater than the second quantity of heartbeats.

For example, as shown in FIG. 10A, if the microphone does not collect the preset moaning sound or crying sound, and the heart rate information of the user "a" indicates that the heart rate of the user "a" is normal (that is, S1002), it indicates that the user "a" does not fall, and the wearable device 10 may perform S301 and S1000. If the microphone collects the preset moaning sound or crying sound, or the heart rate information of the user "a" indicates that the heart rate of the user "a" is abnormal (that is, S1003), it indicates that the user "a" falls, and the wearable device 10 may perform S305.

In this embodiment, the wearable device 10 may further determine, based on whether the user "a" makes the preset moaning sound or crying sound and whether the heart rate of the user "a" is normal, whether the user "a" falls. This can improve accuracy of fall detection performed by the wearable device 10.

In some other embodiments, the foregoing sensor module may further include a sound sensor (that is, the microphone) and the heart rate sensor. The wearable device 10 may collect the speech data by using the sound sensor (that is, the microphone), and collect the heart rate information by using the heart rate sensor. The first preset fall parameter may further include the preset moaning sound, bumping sound, or crying sound, the first quantity of heartbeats, and the second quantity of heartbeats. In the foregoing "first-layer detection", if the wearable device 10 determines that the first motion parameter matches the first preset fall parameter, the wearable device 10 may further determine "whether the speech data collected by the microphone includes the preset moaning sound, bumping sound, or crying sound" and "whether the heart rate indicated by the heart rate information falls within the value interval (m1, m2)". If the speech data includes the preset moaning sound, bumping sound, or crying sound, and the heart rate falls within the value interval (m1, m2), the wearable device 10 may perform the "second-layer detection" or the "third-layer detection". Detection of the speech data and the heart rate is added to the "first-layer detection", so that accuracy of performing the "first-layer detection" by the wearable device 10 can be improved.

When the user wears different types of wearable devices, the wearable devices are worn at different locations. For example, a watch-type wearable device (such as a smartwatch) supported by a wrist is worn on a wrist of the user. For another example, a glass-type wearable device (such as smart glasses) supported by a head is worn on a head of the user. For still another example, a shoes-type wearable device (such as a smart anklet) supported by a foot is worn on an ankle of the user.

It may be understood that, when the user falls, wearable devices worn at different locations detect different motion parameters. In addition, the wearable devices worn at the different locations detect different interference parameters. Therefore, in this embodiment, for each type of wearable devices (for example, watch-type wearable devices), the server 20 may collect statistics on motion parameters collected by this type of wearable devices when a large quantity of users wearing this type of wearable devices fall, to obtain a preset fall parameter corresponding to this type of wearable devices. For each type of wearable devices, the server 20 may collect statistics on motion parameters collected by this type of wearable devices when a large quantity of users wearing this type of wearable devices perform a preset interference action, to obtain a preset interference parameter corresponding to this type of wearable devices.

Figure 10B:
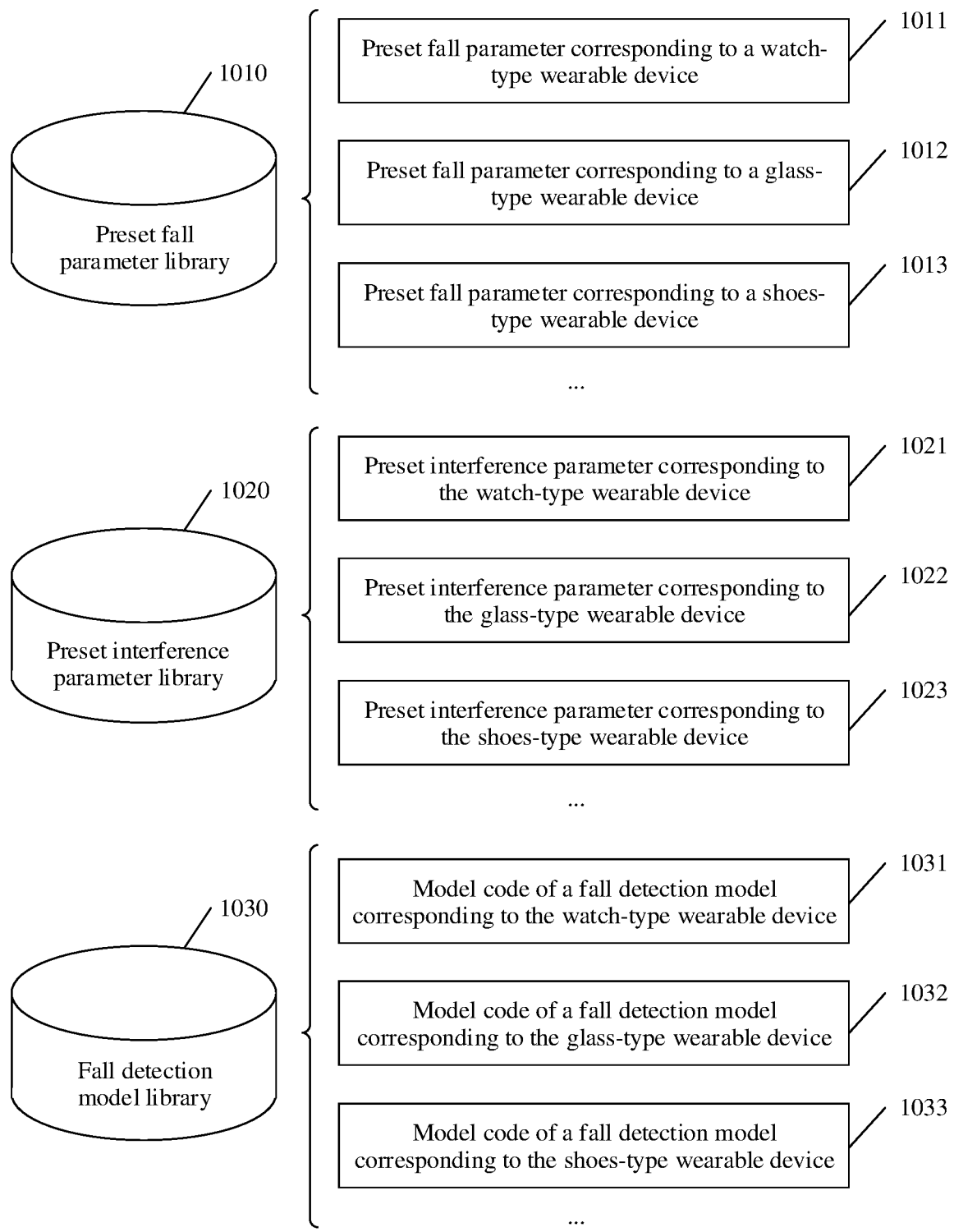
FIG. 10B is a schematic diagram depicting a manner of storing preset fall parameters, preset interference parameters, and model code of fall detection models according to an embodiment.

In this embodiment, the server 20 may store a group of a preset fall parameter and a preset interference parameter for each type of wearable devices. For example, a preset fall parameter library 1010 shown in FIG. 10B may be a storage area for storing the preset fall parameter in the server 20. As shown in FIG. 10B, the preset fall parameter library 1010 stores a preset fall parameter 1011 corresponding to the watch-type wearable device, a preset fall parameter 1012 corresponding to the glass-type wearable device, a preset fall parameter 1013 corresponding to the shoes-type wearable device, and the like. For another example, a preset interference parameter library 1020 shown in FIG. 10B may be a storage area for storing the preset interference parameter in the server 20. As shown in FIG. 10B, the preset interference parameter library 1020 stores a preset interference parameter 1021 corresponding to the watch-type wearable device, a preset interference parameter 1022 corresponding to the glass-type wearable device, a preset interference parameter 1023 corresponding to the shoes-type wearable device, and the like.

Preset interference actions may be different for different types of wearable devices. For example, a preset interference action corresponding to the watch-type wearable device may include an action with a relatively large arm motion amplitude, such as slapping a table, waving a hand, swinging an arm, and wearing clothes by a user. For another example, a preset interference action corresponding to the glass-type wearable device may include an action with a relatively large head motion amplitude, such as nodding, shaking a head, lying down, and jumping. As still another example, a preset interference action corresponding to the shoes-type wearable device may include an action with a relatively large leg motion amplitude, such as kicking, running, and jumping. Therefore, for each type of wearable devices, the server 20 may collect statistics on motion parameters collected by this type of wearable devices when a large quantity of users wearing this type of wearable devices (for example, watch-type wearable devices) perform a preset interference action corresponding to this type of wearable devices, to obtain a preset interference parameter corresponding to this type of wearable devices.

Likewise, for each type of wearable devices, the server 20 may collect statistics on motion parameters (that is, a plurality of second motion parameters) collected by this type of wearable devices when a large quantity of users wearing this type of wearable devices fall, and collect statistics on motion parameters (that is, a plurality of third motion parameters) collected by this type of wearable devices when a large quantity of users wearing this type of wearable devices perform a preset interference action. Then, for each type of wearable devices, the server 20 may perform sample training on the plurality of second motion parameters (or the plurality of second motion parameters and the plurality of third motion parameters) collected by this type of wearable devices, to obtain a fall detection model corresponding to this type of wearable devices and generate corresponding model code.

The server 20 may further store model code of a fall detection model for each type of wearable devices. For example, a fall detection model library 1030 shown in FIG. 10B may be a storage area for storing the model code of the fall detection model in the server 20. As shown in FIG. 10B, the fall detection model library 1030 stores model code 1031 of a fall detection model corresponding to the watch-type wearable device, model code 1032 of a fall detection model corresponding to the glass-type wearable device, model code 1033 of a fall detection model corresponding to the shoes-type wearable device, and the like.

It should be noted that the wearable device 10 may store a preset fall parameter (that is, the first preset fall parameter), a preset interference parameter (that is, the first preset interference parameter), and model code of a fall detection model (that is, the first fall detection model) that correspond to a type of only the wearable device 10. For example, it is assumed that the wearable device 10 is the glass-type wearable device. The wearable device 10 may store the preset fall parameter 1012, the preset interference parameter 1022, and the model code 1032 of the fall detection model that are shown in FIG. 10B.

In this embodiment, the server 20 may store a group of a preset fall parameter, a preset interference parameter, and a fall detection model for each type of wearable devices. Therefore, the server 20 may update, based on a first identifier by using the first motion parameter, a preset fall parameter or a preset interference parameter and a fall detection model that correspond to the first identifier. For example, the second message and the third message may further include a first identifier of the wearable device 10. The first identifier may be used to indicate the type of the wearable device 10. For example, when the first identifier is 00, it indicates that the wearable device 10 is the watch-type wearable device. When the first identifier is 01, it indicates that the wearable device 10 is the glass-type wearable device. When the first identifier is 10, it indicates that the wearable device 10 is the shoes-type wearable device.

For example, the first identifier indicates that the wearable device 10 is the shoes-type wearable device. It is assumed that the wearable device 10 further sends the first indication information when sending the first motion parameter to the server 20. In response to the first indication information, the server 20 may update a preset fall parameter and a fall detection model. For example, the first identifier indicates that the wearable device 10 is the shoes-type wearable device. Therefore, the server 20 may update, by using the first motion parameter, the preset fall parameter 1013 and the fall detection model 1033 that correspond to the shoes-type wearable device.

Likewise, the server 20 may send an updated preset fall parameter, an updated preset interference parameter, and model code of an updated fall detection model that correspond to the first identifier to the wearable device 10 based on the first identifier of the wearable device 10.

In this embodiment, the server 20 may maintain a group of a preset fall parameter, a preset interference parameter, and a fall detection model for each of different types of wearable devices. In addition, the wearable device 10 may store a group of a preset fall parameter, a preset interference parameter, and a fall detection model that correspond to the type of the wearable device 10. The wearable device 10 performs fall detection by using the group of the preset fall parameter, the preset interference parameter, and the fall detection model that correspond to the type of the wearable device 10. This can improve accuracy of the fall detection.

When the user is in different scenarios, granularities for performing fall detection by the wearable device 10 are different. A granularity at which the wearable device 10 performs fall detection may be represented by using a preset fall parameter, a preset interference parameter, and a fall detection model. In other words, in this embodiment, when the user is in different scenarios, different preset fall parameters, different preset interference parameters, and different fall detection models are used by the wearable device 10 to perform fall detection.

For example, the foregoing scenarios may include at least a sleeping scenario, an outdoor scenario, an indoor scenario, a sport scenario, a scenario of going upstairs and downstairs, and the like. In this embodiment, the wearable device 10 may determine a scenario in which the user is located by using parameters collected by a plurality of sensors (for example, a heart rate sensor, an acceleration sensor, and a gyro sensor), the positioning module (for example, a GPS module), and the like of the wearable device 10. In the following embodiment, a scenario 1, a scenario 2, and a scenario 3 are used as examples to describe the method in this embodiment. The scenario 1, the scenario 2, and the scenario 3 are three scenarios in a sleeping scenario, an outdoor scenario, an indoor scenario, a sport scenario, a scenario of going upstairs and downstairs, and the like.

It may be understood that when the user falls in different scenarios, motion parameters detected by the wearable device are different. In addition, interference parameters collected when the user falls in different scenarios are also different. Therefore, in this embodiment, for each scenario, the server 20 may collect statistics on motion parameters collected by wearable devices when a large quantity of users fall in the scenario, to obtain a preset fall parameter corresponding to the scenario. For each scenario, the server 20 may collect statistics on motion parameters collected by wearable devices when a large quantity of users perform a preset interference action in the scenario, to obtain a preset interference parameter corresponding to the scenario.

Figure 11:
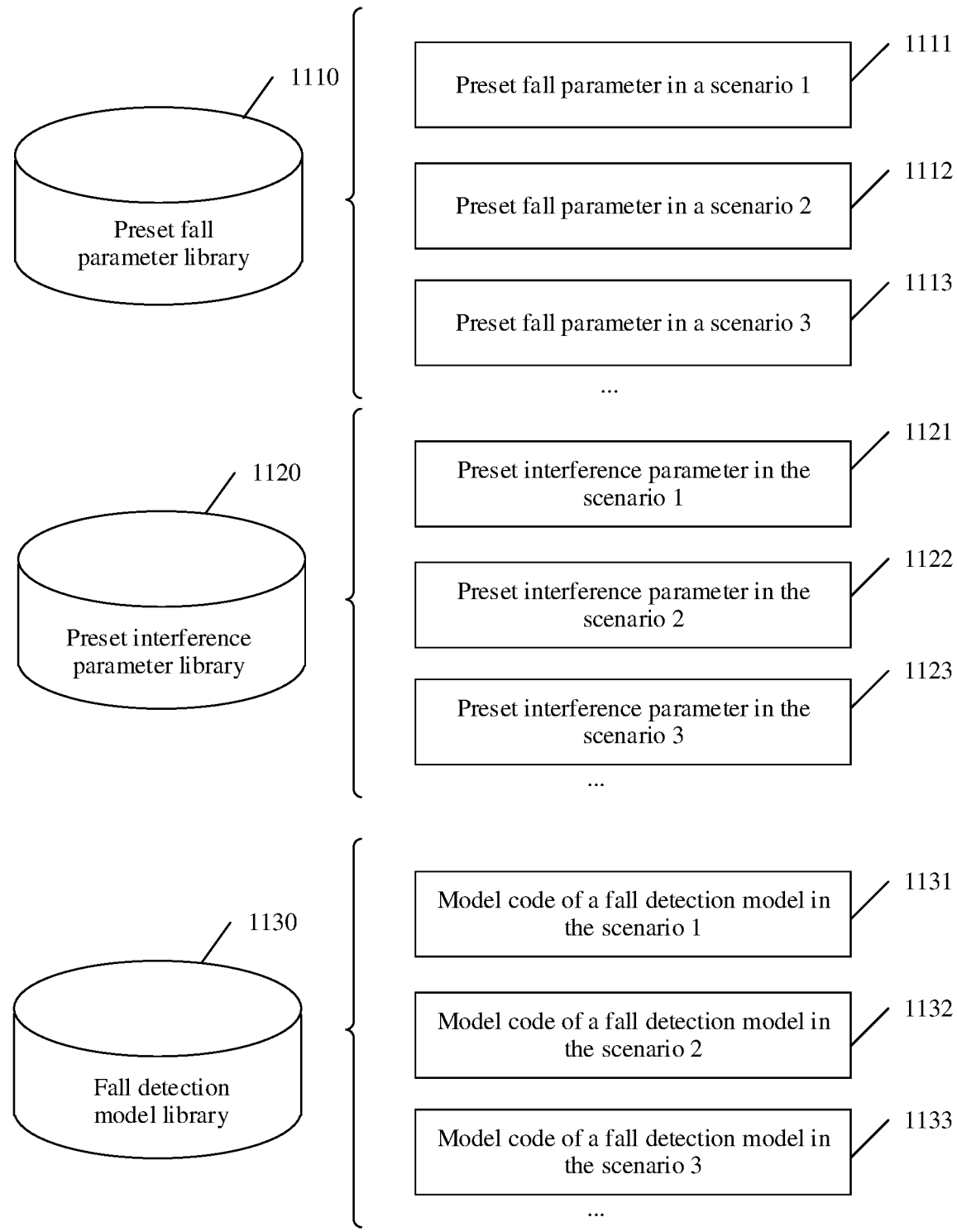
FIG. 11 is a schematic diagram depicting another manner of storing preset fall parameters, preset interference parameters, and model code of fall detection models according to an embodiment.

In this embodiment, the server 20 and the wearable device 10 may store a group of a preset fall parameter and a preset interference parameter for each scenario. For example, a preset fall parameter library 1110 shown in FIG. 11 may be a storage area for storing the preset fall parameter in the server 20 and the wearable device 10. As shown in FIG. 11, a preset fall parameter library 1110 stores a preset fall parameter 1111 of the scenario 1, a preset fall parameter 1112 of the scenario 2, a preset fall parameter 1113 of the scenario 3, and the like. For another example, a preset interference parameter library 1120 shown in FIG. 11 may be a storage area for storing the preset interference parameter in the server 20 and the wearable device 10. As shown in FIG. 11, a preset interference parameter library 1120 stores a preset interference parameter 1121 of the scenario 1, a preset interference parameter 1122 of the scenario 2, a preset interference parameter 1123 of the scenario 3, and the like.

Preset interference actions of the user in different scenarios may be different. For example, preset interference actions of the user in a sleeping scenario may include turning over and the like. For another example, interference actions of the user in a sport scenario may include kicking, running, jumping, and the like. For still another example, interference actions of the user in a scenario of going upstairs and downstairs may include lifting a leg and the like. Therefore, for each scenario, the server 20 may collect statistics on motion parameters collected by wearable devices when a large quantity of users perform a preset interference action corresponding to the scenario in the scenario, to obtain a preset interference parameter corresponding to the scenario.

Likewise, for each scenario, the server 20 may collect statistics on motion parameters (that is, a plurality of second motion parameters) collected by wearable devices when a large quantity of users fall in the scenario, and collect statistics on motion parameters (that is, a plurality of third motion parameters) collected by wearable devices when a large quantity of users perform a preset interference action in the scenario. Then, for each scenario, the server 20 may perform sample training on the plurality of second motion parameters (or the plurality of second motion parameters and the plurality of third motion parameters) collected by the wearable devices in the scenario, to obtain a fall detection model corresponding to the scenario and generate corresponding model code.

The server 20 and the wearable device 10 may further store model code of a fall detection model for each scenario. For example, a fall detection model library 1130 shown in FIG. 11 may be a storage area for storing the model code of the fall detection model in the server 20 and the wearable device 10. As shown in FIG. 11, the fall detection model library 1130 stores model code 1131 of a fall detection model in the scenario 1, model code 1132 of a fall detection model in the scenario 2, model code 1133 of a fall detection model in the scenario 3, and the like.

In this embodiment, the server 20 and the wearable device 10 may store a group of a preset fall parameter, a preset interference parameter, and a fall detection model for each scenario. Therefore, the server 20 may update, based on a second identifier (that is, an identifier of a scenario) by using the first motion parameter, a preset fall parameter or a preset interference parameter and a fall detection model that correspond to the second identifier. For example, the second message and the third message may further include the second identifier, that is, an identifier of a scenario in which the user "a" is currently located. For example, when the second identifier is 000, it indicates that the user "a" is in a sleeping scenario. When the identifier is 001, it indicates that the user "a" is in an outdoor scenario. When the identifier is 010, it indicates that the user "a" is in a sport scenario.

For example, the second identifier indicates that the user "a" is in the scenario 3 (for example, a sport scenario). It is assumed that the wearable device 10 further sends the first indication information when sending the first motion parameter to the server 20. In response to the first indication information, the server 20 may update a preset fall parameter and a fall detection model. For example, the second identifier indicates that the user "a" is in the scenario 3. Therefore, the server 20 may update the preset fall parameter 1113 and the fall detection model 1133 in the scenario 3 by using the first motion parameter.

Likewise, the server 20 may send, to the wearable device 10, an updated preset fall parameter, an updated preset interference parameter, and model code of an updated fall detection model in the scenario indicated by the second identifier.

In this embodiment, the server 20 and the wearable device 10 may maintain a group of a preset fall parameter, a preset interference parameter, and a fall detection model for each of different scenarios. When the user is in different scenarios, the wearable device 10 performs fall detection by using groups of preset fall parameters, preset interference parameters, and fall detection models that correspond to the scenarios. This can improve accuracy of the fall detection.

Figure 12:
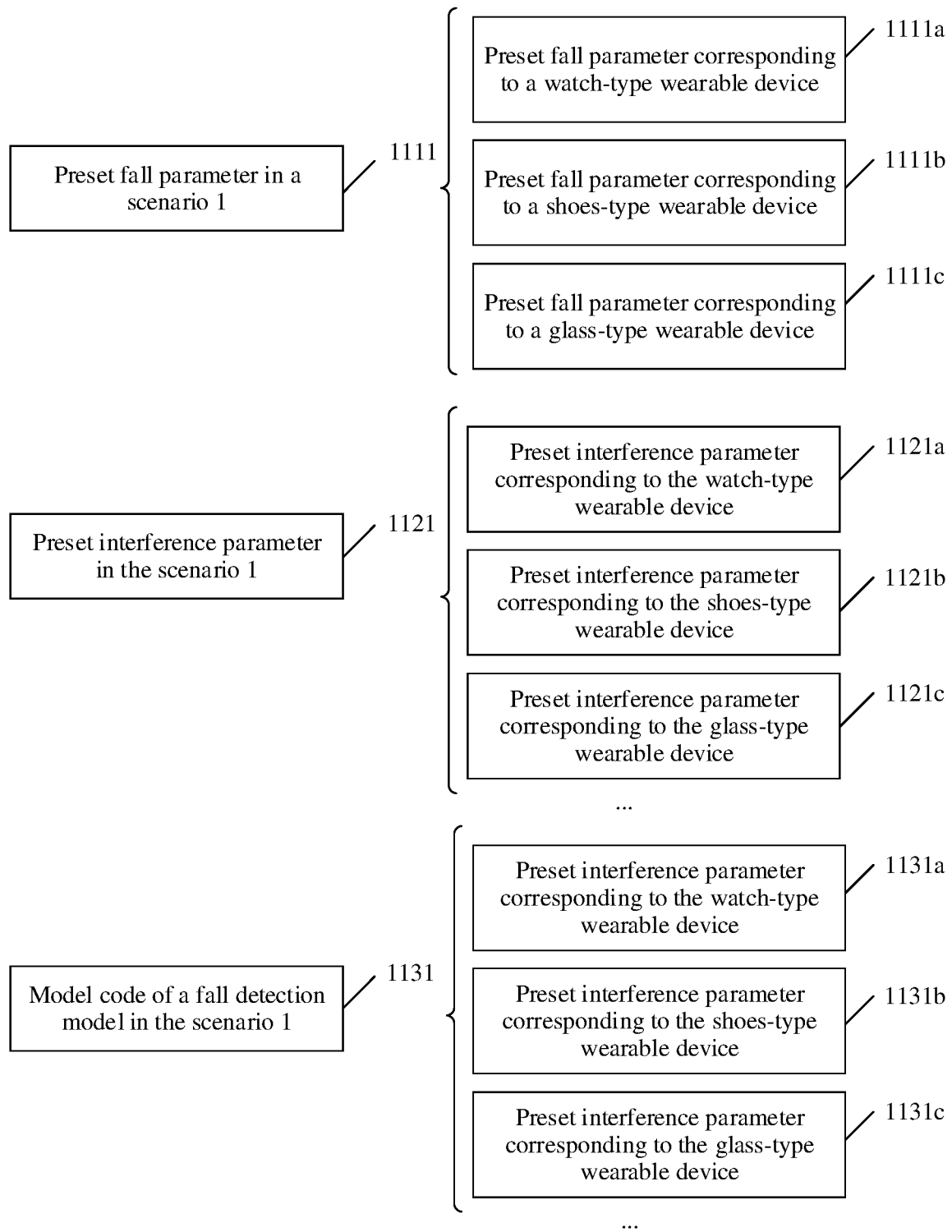
FIG. 12 is a schematic diagram depicting another manner of storing preset fall parameters, preset interference parameters, and model code of fall detection models according to an embodiment.

Optionally, preset fall parameters in each scenario may be classified into a plurality of types of preset fall parameters based on types of wearable devices. For example, as shown in FIG. 12, the preset fall parameter 1111 in the scenario 1 may include a preset fall parameter 1111*a* corresponding to the watch-type wearable device, a preset fall parameter 1111*b* corresponding to the glass-type wearable device, a preset fall parameter 1111*c* corresponding to the shoes-type wearable device, and the like.

Preset interference parameters in each scenario may be classified into a plurality of types of preset interference parameters based on types of wearable devices. For example, as shown in FIG. 12, the preset interference parameter 1121 in the scenario 1 may include a preset interference parameter 1121*a* corresponding to the watch-type wearable device, a preset interference parameter 1121*b* corresponding to the glass-type wearable device, a preset interference parameter 1121*c* corresponding to the shoes-type wearable device, and the like.

Fall detection modes in each scenario may be classified into a plurality of types of fall detection models based on types of wearable devices. For example, as shown in FIG. 12, the model code 1131 of the fall detection model in the scenario 1 may include model code 1131*a* of a fall detection model corresponding to the watch-type wearable device, model code 1131*b* of a fall detection model corresponding to the glass-type wearable device, model code 1131*c* of a fall detection model corresponding to the shoes-type wearable device, and the like.

The preset contact in this embodiment may be preset by the user in the wearable device 10. When the wearable device 10 is powered on for the first time, the wearable device 10 may guide the user to set an emergency contact. For example, after being powered on for the first time, the wearable device 10 may display an emergency contact setting interface. Alternatively, a settings application of the wearable device 10 may include an "emergency contact" option. For example, a setting interface 1301 shown in FIG. 13(*a*) includes an "emergency contact" option 1302. In response to a tap operation performed by the user on the "emergency contact" option, the wearable device 10 may display an emergency contact setting interface 1303 shown in FIG. 13(*b*). In response to information that is about an emergency contact and that is entered by the user in the emergency contact setting interface, the wearable device 10 stores the information that is about the emergency contact and that is entered by the user.

For example, the emergency contact setting interface 1303 includes a contact information input box 1305, and the contact information input box 1305 is used to enter information about an emergency contact. The wearable device 10 may receive a mobile phone number or a contact name entered by the user in the input box 1305, and then obtain and store information about the contact from an address book of the wearable device 10. Alternatively, the wearable device 10 may display, for selection by the user, a list of contacts in an address book of the wearable device 10 in response to a tap operation performed by the user on a contact adding button 1306.

Figures 13A, 13B:
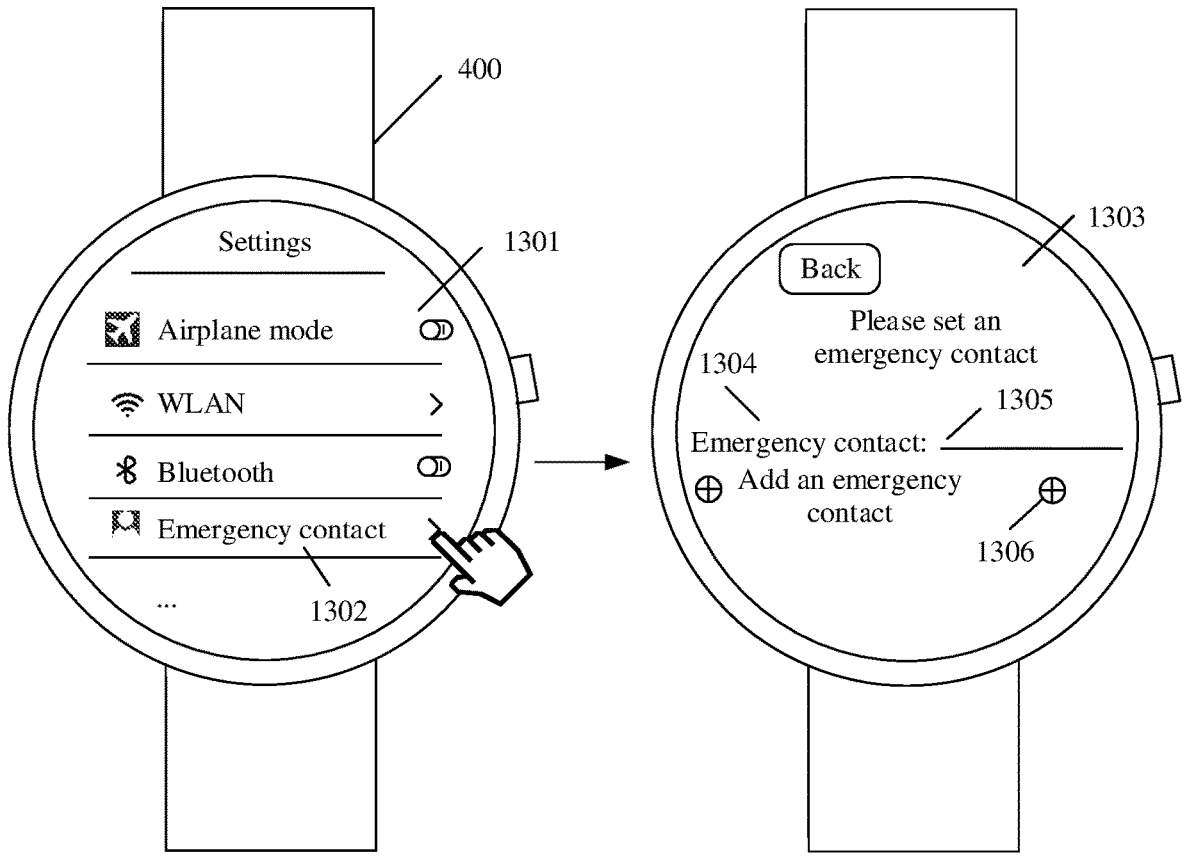
FIG. 13(a) and FIG. 13(b) are a schematic diagram depicting an example of another display interface according to an embodiment.

It should be noted that specific content and an interface form of the emergency contact setting interface in this embodiment include but are not limited to the emergency contact setting interface 1303 shown in FIG. 13(*b*), and another interface form of the emergency contact setting interface is not described in this embodiment.

In this embodiment, the wearable device 10 may receive and store the emergency contact that is set by the user. In this way, even if the user falls, the wearable device 10 may still perform the method in this embodiment, to request the emergency contact preset by the user in the wearable device 10 to aid the user.

Some embodiments provide an electronic device, and the electronic device may include a motion sensor. The motion sensor includes an acceleration sensor or a gyro sensor. The electronic device further includes a memory and one or more processors. The motion sensor, the memory, and the processor are coupled. The memory is configured to store computer program code, and the computer program code includes computer instructions. When the processor executes the computer instructions, the electronic device may perform functions or steps performed by the electronic device in the foregoing method embodiments. For a structure of the electronic device, refer to the structure of the mobile phone 100 shown in FIG. 1B or the structure of the smartwatch 200 shown in FIG. 2.

Figure 14:
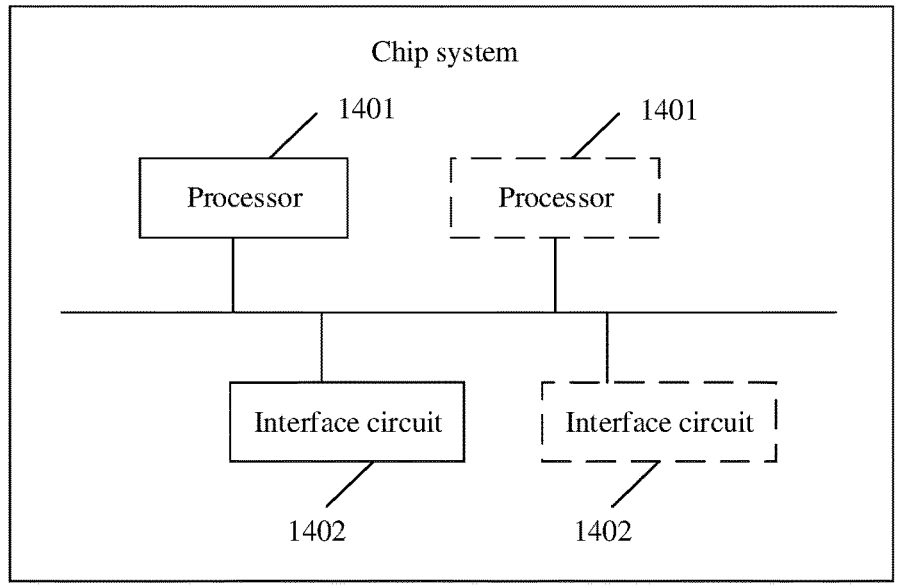
FIG. 14 is a schematic diagram depicting a structure of a chip system according to an embodiment.

An embodiment further provides a chip system. As shown in FIG. 14, the chip system includes at least one processor 1401 and at least one interface circuit 1402. The processor 1401 and the interface circuit 1402 may be interconnected by using a line. For example, the interface circuit 1402 may be configured to receive a signal from another apparatus (for example, a memory of an electronic device). For another example, the interface circuit 1402 may be configured to send a signal to another apparatus (for example, the processor 1401 or a touchscreen of an electronic device). For example, the interface circuit 1402 may read instructions stored in the memory and send the instructions to the processor 1401. When the instructions are executed by the processor 1401, the electronic device is enabled to perform the steps in the foregoing embodiments. Additionally, the chip system may further include another discrete device. This is not limited in this embodiment.

An embodiment further provides a computer storage medium. The computer storage medium includes computer instructions. When the computer instructions are run on the foregoing electronic device, the electronic device is enabled to perform functions or steps performed by the electronic device in the foregoing method embodiments.

An embodiment further provides a computer program product. When the computer program product runs on a computer, the computer is enabled to perform functions or steps performed by the electronic device in the foregoing method embodiments.

The foregoing descriptions about implementations allow a person of ordinary skill in the art to clearly understand that, for the purpose of convenient and brief description, division into only the foregoing functional modules is used as an example for illustration. In actual application, the foregoing functions can be allocated to different functional modules for implementation based on a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments, it should be understood that the disclosed system, apparatus, and method may be implemented in other manners. For example, the described apparatus embodiments are merely examples. For example, division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in a form of a software functional unit and sold or used as an independent product, the integrated unit may be stored in a computer-readable storage medium. Based on such an understanding, the solutions of the embodiments essentially, or the part contributing to the prior art, or all or some of the solutions may be implemented in a form of a software product. The computer software product is stored in a storage medium and includes several instructions for instructing a computer device (which may be a personal computer, a server, or a network device) or a processor to perform all or some of the steps of the methods described in the embodiments. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments, and are not intended to limit the scope of the embodiments. Any variation or replacement within the scope disclosed in the embodiments shall fall within the scope of the embodiments.

What is claimed is:

1. A help-seeking method applied to an electronic device comprising a motion sensor having at least one of an acceleration sensor or a gyro sensor, the help-seeking method comprising:

collecting, by the electronic device, a first motion parameter of a user by using the motion sensor;

obtaining, by the electronic device, a fall confidence of the first motion parameter by comparing the first motion parameter to a first preset fall parameter, wherein the fall confidence of the first motion parameter is used to represent a probability that the first motion parameter is a motion parameter collected when the user falls;

activating a voice assistant and collecting, by the electronic device, a speech command of the user; and, in response to the speech command, performing a speech control event to control the electronic device corresponding to the speech command;

sending, by the electronic device, help-seeking information after the fall confidence of the first motion parameter is greater than a preset confidence threshold;

storing, by the electronic device, a model code of a first fall detection model used to determine a fall confidence of a motion parameter, wherein the first fall detection model is an artificial intelligence (AI) model obtained by performing sample training by using a plurality of second motion parameters and a plurality of third motion parameters; and running, by the electronic device, the model code of the first fall detection model, to determine the fall confidence of the first motion parameter, wherein the plurality of second motion parameters are motion parameters collected when a plurality of users fall and the plurality of third motion parameters are motion parameters collected when the plurality of users perform a preset interference action.

2. The help-seeking method according to claim 1, wherein the sending, by the electronic device, of the help-seeking information further comprises:
   playing, by the electronic device, at least one of a help-seeking speech or an alarm sound.

3. The help-seeking method according to claim 1, wherein the sending, by the electronic device, of the help-seeking information further comprises:
   calling, by the electronic device, a first preset contact, wherein the first preset contact is any emergency contact or a public rescue service preset in the electronic device.

4. The help-seeking method according to claim 3, wherein the sending, by the electronic device, of the help-seeking information further comprises:
   displaying, by the electronic device, a first interface, wherein the first interface comprises a plurality of contact options, each contact option corresponds to a respective preset contact in the electronic device, and the respective preset contact comprises the emergency contact or the public rescue service preset in the electronic device; and
   receiving, by the electronic device, a selection operation performed by the user on a contact option of the first preset contact in the first interface; and the calling, by the electronic device, of the first preset contact further comprises:
   calling, by the electronic device, the first preset contact in response to the selection operation performed by the user on the contact option of the first preset contact.

5. The help-seeking method according to claim 1, wherein the sending, by the electronic device, of the help-seeking information further comprises:
   sending, by the electronic device, a first message to one or more preset contacts through one or more communication applications, wherein the first message comprises the help-seeking information, and the one or more preset contacts comprise the emergency contact or the public rescue service preset in the electronic device.

6. The help-seeking method according to claim 5, wherein the electronic device comprises a positioning module, and the help-seeking method further comprises:
   obtaining, by the electronic device, geographical location information of the electronic device by using the positioning module, wherein the first message further comprises the geographical location information.

7. The help-seeking method according to claim 1, wherein the obtaining, by the electronic device, of the fall confidence of the first motion parameter further comprises:
   obtaining, by the electronic device, a matching degree between the first motion parameter and a first preset interference parameter; and
   determining the fall confidence based on the matching degree, wherein a lower matching degree indicates a higher fall confidence and a higher matching degree indicates a lower fall confidence.

8. The help-seeking method according to claim 1, wherein the electronic device further comprises a heart rate sensor and a microphone, and the help-seeking method further comprises:
   collecting, by the electronic device, heart rate information of the user by using the heart rate sensor;
   collecting speech data of the user by using the microphone;
   after the fall confidence of the first motion parameter is less than or equal to the preset confidence threshold, determining, by the electronic device, that the microphone collects a preset moaning sound, a bumping sound, or a crying sound, or the heart rate information indicates that a heart rate of the user is less than a first quantity of heart beats or greater than a second quantity of heart beats, wherein the first quantity of heart beats is a minimum quantity of heart beats per minute of a normal person, and the second quantity of heart beats is a maximum quantity of heart beats per minute of the normal person; and
   sending, by the electronic device, the help-seeking information.

9. An electronic device comprising
   a motion sensor having at least one of an acceleration sensor or a gyro sensor;
   a memory; and
   one or more processors, wherein the motion sensor, the memory, and the processor are coupled, the memory is configured to store computer program code, the computer program code comprises computer instructions, and when the computer instructions are executed by the electronic device, the electronic device is configured to
   collect a first motion parameter of a user,
   obtain a fall confidence of the first motion parameter by comparing the first motion parameter collected by the motion sensor to a first preset fall parameter, wherein the fall confidence of the first motion parameter is used to represent a probability that the first motion parameter is a motion parameter collected when the user falls,
   activate a voice assistant and collect a speech command of the user; and, in response to the speech command, perform a speech control event to control the electronic device corresponding to the speech command,
   send help-seeking information after the fall confidence of the first motion parameter is greater than a preset confidence threshold,
   store a model code of a first fall detection model used to determine a fall confidence of a motion parameter, wherein the first fall detection model is an artificial intelligence (AI) model obtained by performing sample training by using a plurality of second motion parameters and a plurality of third motion parameters, and
   run the model code of the first fall detection model, to determine the fall confidence of the first motion parameter, wherein the plurality of second motion parameters are motion parameters collected when a plurality of users fall and the plurality of third motion parameters are motion parameters collected when the plurality of users perform a preset interference action.

10. The electronic device according to claim 9, further comprising:
    a speaker, wherein the electronic device is further configured to
    control the speaker to play at least one of a help-seeking speech or an alarm sound.

11. The electronic device according to claim 9, wherein the electronic device is further configured to
    call a first preset contact, wherein the first preset contact is any emergency contact or a public rescue service pre-stored in the memory.

12. The electronic device according to claim 11, further comprising:

a display having a touchscreen, wherein the electronic device is further configured to control the display to display a first interface, wherein the first interface comprises a plurality of contact options, each contact option corresponds to a respective preset contact in the electronic device, and the respective preset contact comprises the emergency contact or the public rescue service preset in the electronic device, receive a selection operation performed by the user on a contact option of the first preset contact in the first interface, and call the first preset contact in response to the selection operation performed by the user on the contact option of the first preset contact.

13. The electronic device according to claim 9, wherein one or more communication applications are installed in the electronic device, and the electronic device is further configured to send a first message to one or more preset contacts through the one or more communication applications, wherein the first message comprises the help-seeking information, and the one or more preset contacts comprise the emergency contact or the public rescue service pre-stored in the memory.

14. The electronic device according to claim 13, further comprising:

a positioning module, wherein the electronic device is further configured to obtain geographical location information of the electronic device, wherein the first message further comprises the geographical location information.

15. The electronic device according to claim 9, wherein the electronic device is further configured to obtain a matching degree between the first motion parameter and a first preset interference parameter, and determine the fall confidence based on the matching degree, wherein a lower matching degree indicates a higher fall confidence, and a higher matching degree indicates a lower fall confidence.

16. The electronic device according to claim 9, further comprising:

a heart rate sensor; and a microphone, wherein the electronic device is further configured to collect heart rate information of the user, collect speech data of the user, and, after the fall confidence of the first motion parameter is less than or equal to the preset confidence threshold, determine that the microphone collects a preset moaning sound, a bumping sound, or a crying sound, or the heart rate information indicates that a heart rate of the user is less than a first quantity of heart beats or greater than a second quantity of heart beats, wherein the first quantity of heart beats is a minimum quantity of heart beats per minute of a normal person, and the second quantity of heart beats is a maximum quantity of heart beats per minute of the normal person; and send the help-seeking information.

17. A chip system, wherein the chip system is used in an electronic device comprising a touchscreen, the chip system comprises:

one or more interface circuits; and one or more processors, wherein an interface circuit and the one or more processors are interconnected through a line, the one or more interface circuits are configured to receive a signal from a memory of the electronic device, and send the signal to the processor, the signal comprises computer instructions stored in the memory, and when the processor executes the computer instructions, the electronic device is configured to collect a first motion parameter of a user, obtain a fall confidence of the first motion parameter by comparing the first motion parameter collected by a motion sensor to a first preset fall parameter, wherein the fall confidence of the first motion parameter is used to represent a probability that the first motion parameter is a motion parameter collected when the user falls, activate a voice assistant and collect a speech command of the user; and, in response to the speech command, perform a speech control event to control the electronic device corresponding to the speech command, send help-seeking information after the fall confidence of the first motion parameter is greater than a preset confidence threshold store a model code of a first fall detection model used to determine a fall confidence of a motion parameter, wherein the first fall detection model is an artificial intelligence (AI) model obtained by performing sample training by using a plurality of second motion parameters and a plurality of third motion parameters, and run the model code of the first fall detection model, to determine the fall confidence of the first motion parameter, wherein the plurality of second motion parameters are motion parameters collected when a plurality of users fall and the plurality of third motion parameters are motion parameters collected when the plurality of users perform a preset interference action.

* * * * *